US012713301B2

(12) United States Patent
Lu et al.

(10) Patent No.: US 12,713,301 B2
(45) Date of Patent: Aug. 18, 2026

(54) NETWORK NODES AND METHODS THEREIN FOR SECONDARY RAT USAGE REPORTING

(71) Applicant: Telefonaktiebolaget LM Ericsson (PUBL), Stockholm (SE)

(72) Inventors: Yunjie Lu, Shanghai (CN); Yong Yang, Kållered (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 376 days.

(21) Appl. No.: 18/681,578

(22) PCT Filed: Jul. 28, 2022

(86) PCT No.: PCT/CN2022/108573
§ 371 (c)(1),
(2) Date: Feb. 6, 2024

(87) PCT Pub. No.: WO2023/011308
PCT Pub. Date: Feb. 9, 2023

(65) Prior Publication Data

US 2024/0381187 A1 Nov. 14, 2024

(30) Foreign Application Priority Data

Aug. 6, 2021 (WO) ................ PCT/CN2021/111172

(51) Int. Cl.
*H04W 36/00* (2009.01)

(52) U.S. Cl.
CPC . *H04W 36/0022* (2013.01); *H04W 36/00222* (2023.05); *H04W 36/0055* (2013.01)

(58) Field of Classification Search
CPC . H04W 88/06; H04W 28/12; H04W 36/0033; H04W 36/0022; H04W 36/00222; H04W 36/0055; H04W 4/24
See application file for complete search history.

(56) References Cited

U.S. PATENT DOCUMENTS

2016/0142554 A1* 5/2016 Anand .............. H04M 15/8214 455/406
2020/0229069 A1* 7/2020 Chun .................... H04W 76/30
(Continued)

FOREIGN PATENT DOCUMENTS

CN 102387009 A 3/2012
CN 112997578 A 6/2021
(Continued)

OTHER PUBLICATIONS

3GPP TS 23.502 v17.1.0 (Jun. 2021) 3rd Generation Partnership Project; Technical Specification Group Services and System Aspects; Procedures for the 5G System (5GS); Stage 2 (Release 17).
(Continued)

*Primary Examiner* — Mong-Thuy T Tran
(74) *Attorney, Agent, or Firm* — Baker Botts L.L.P.

(57) ABSTRACT

The present disclosure provides a method (600) in an Access and Mobility Management Function, AMF. The method (600) includes, in a $5^{th}$ Generation System, 5GS, to Evolved Packet System, EPS, handover procedure of a User Equipment, UE: receiving (610), from a Next Generation Radio Access Network, NG-RAN, node, a secondary Radio Access Technology, RAT, usage data report message including a Secondary RAT Usage Data Report Transfer Information Element, IE, containing secondary RAT usage data associated with the UE; and transmitting (620), to a Mobility Management Entity, MME, a message including a first IE containing the secondary RAT usage data.

22 Claims, 9 Drawing Sheets

(56) References Cited

U.S. PATENT DOCUMENTS

| | | | | |
|---|---|---|---|---|
| 2020/0245127 | A1* | 7/2020 | Zong | H04W 8/02 |
| 2021/0022024 | A1* | 1/2021 | Yao | H04W 24/08 |
| 2021/0022059 | A1* | 1/2021 | Raval | H04W 8/02 |
| 2021/0092664 | A1* | 3/2021 | Lai | H04W 8/08 |
| 2021/0105685 | A1* | 4/2021 | Li | H04W 36/0011 |
| 2021/0258766 | A1* | 8/2021 | Watanabe | H04W 48/16 |
| 2021/0306817 | A1* | 9/2021 | Kim | H04L 12/1425 |
| 2022/0014993 | A1* | 1/2022 | Kodaypak | H04W 36/00222 |
| 2022/0141719 | A1* | 5/2022 | Shan | H04W 36/26 370/331 |
| 2022/0408301 | A1* | 12/2022 | Parikh | H04M 15/61 |

FOREIGN PATENT DOCUMENTS

| | | | |
|---|---|---|---|
| WO | WO2016160413 | A1 | 10/2016 |
| WO | WO2020119954 | A1 | 6/2020 |

OTHER PUBLICATIONS

3GPP TS 37.340 v16.6.0 (Jun. 2021) 3rd Generation Partnership Project; Technical Specification Group Radio Access Network; Evolved Universal Terrestrial Radio Access (E-UTRA) and NR; Multi-connectivity; Stage 2 (Release 16).

3GPP TSG-RAN WG2 #107; Prague, Czech Republic, Aug. 26-30, 2019; Change Request; 37.340 CR rev Current version: 15.6.0; Title: Support of Inter-RAT HO between NR to EN-DC in Rel-16; Source to WG: China Telecom (R2-1911189).

EPO Communication pursuant to Rules 70(2) and 70a(2) EPC issued for Application No. Patent No. 22852022.7-1206 / 4381783 PCT/CN2022108573—May 30, 2025.

3GPP TS 23.502 V17.0.0 (Mar. 2021); 3rd Generation Partnership Project; Technical Specification Group Services and System Aspects; Procedures for the 5G System (5GS); Stage 2 (Release 17).

3GPP TS 29.274 V17.1.1 (Mar. 2021); 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 17).

3GPP TS 23.401 V17.0.0 (Mar. 2021); 3rd Generation Partnership Project; Technical Specification Group Services and System Aspects; General Packet Radio Service (GPRS) enhancements for Evolved Universal Terrestrial Radio Access Network (E-UTRAN) access (Release 17).

3GPP TS 29.502 V17.1.0 (Jun. 2021); 3rd Generation Partnership Project; Technical Specification Group Core Network and Terminals; 5G System; Session Management Services; Stage 3 (Release 17).

3GPP TS 23.501 V17.0.0 (Mar. 2021); 3rd Generation Partnership Project; Technical Specification Group Services and System Aspects; System architecture for the 5G System (5GS); Stage 2 (Release 17).

3GPP TSG-RAN3 Meeting #102; Spokane, US, Nov. 12-16, 2018; Title: (TP for NR BL CR for TS 37.340) Data Volume Reporting in 5GC; Source: Huawei; Agenda Item: 8.1 (R3-187038).

3GPP TSG-SA WG2 Meeting #129bis; Nov. 26-30, 2018, West Palm Beach, USA; Change Request; 23.502 CR 0863 rev-Current Version: 15.3.0; Title: Data Volume Reporting for Option 4/7—Procedure updates (S2-1813079).

PCT International Search Report issued for International application No. PCT/CN2022/108573—Nov. 2, 2022.

PCT Written Opinion of the International Searching Authority issued for International application No. PCT/CN2022/108573—Nov. 2, 2022.

3GPP TS 36.300 V16.6.0 (Jun. 2021); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).

3GPP TS 38.300 V16.6.0 (Jun. 2021); 3rd Generation Partnership Project; Technical Specification Group Radio Access Network; NR; NR and NG-RAN Overall Description; Stage 2 (Release 16).

3GPP TS 38.413 V16.6.0 (Jul. 2021); 3rd Generation Partnership Project; Technical Specification Group Radio Access Network; NG-RAN; NG Application Protocol (NGAP) (Release 16).

3GPP TS 23.251 V16.0.0 (Jul. 2020); 3rd Generation Partnership Project; Technical Specification Group Services and System Aspects; Network Sharing; Architecture and functional description (Release 16).

* cited by examiner

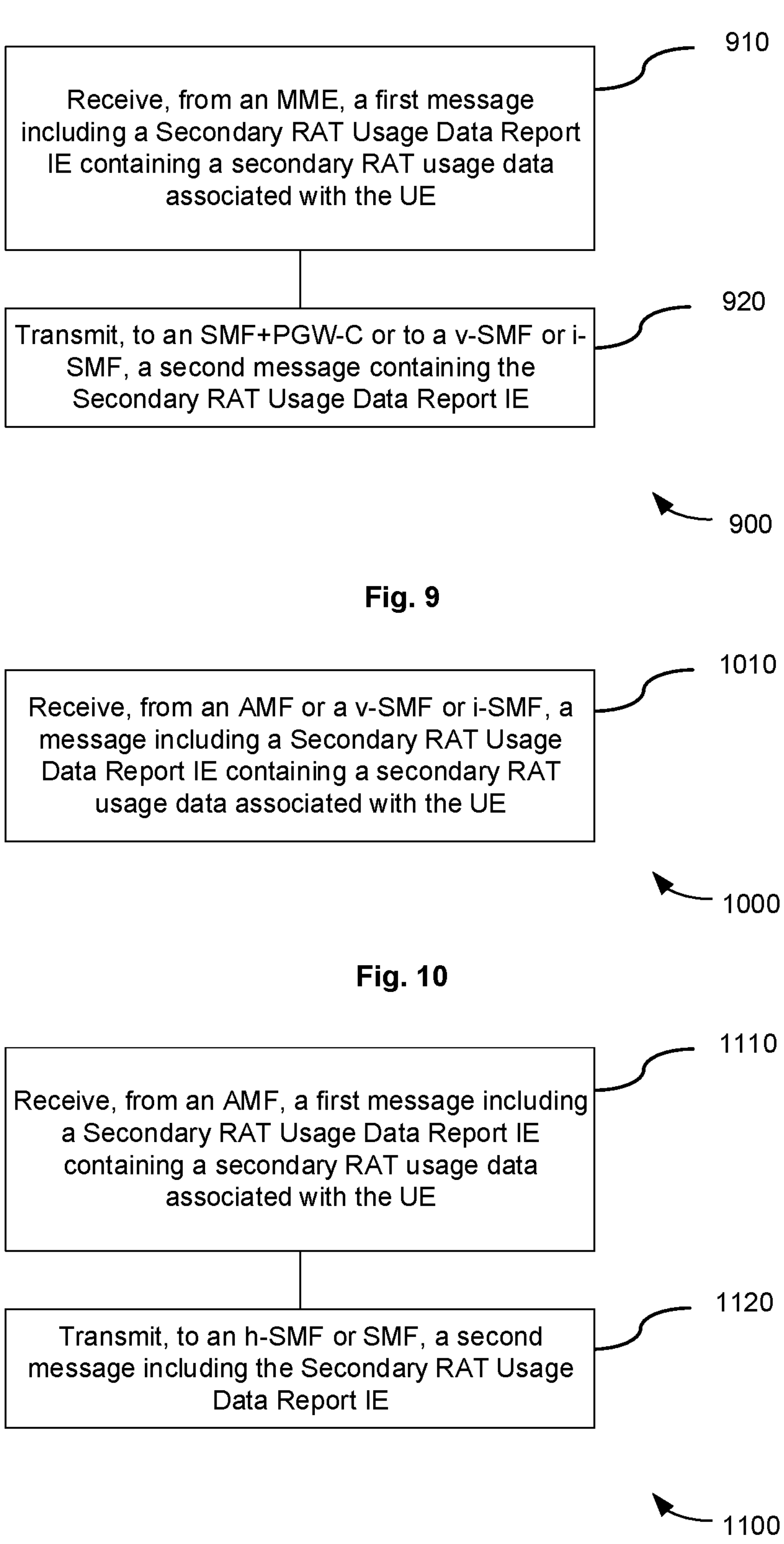
910
Receive, from an MME, a first message including a Secondary RAT Usage Data Report IE containing a secondary RAT usage data associated with the UE
920
Transmit, to an SMF+PGW-C or to a v-SMF or i-SMF, a second message containing the Secondary RAT Usage Data Report IE
900
Fig. 9
1010
Receive, from an AMF or a v-SMF or i-SMF, a message including a Secondary RAT Usage Data Report IE containing a secondary RAT usage data associated with the UE
1000
Fig. 10
1110
Receive, from an AMF, a first message including a Secondary RAT Usage Data Report IE containing a secondary RAT usage data associated with the UE
1120
Transmit, to an h-SMF or SMF, a second message including the Secondary RAT Usage Data Report IE
1100
Fig. 11

NETWORK NODES AND METHODS THEREIN FOR SECONDARY RAT USAGE REPORTING

PRIORITY

This nonprovisional application is a U.S. National Stage Filing under 35 U.S.C. § 371 of International Patent Application Serial No. PCT/CN2022/108573 filed Jul. 28, 2022 and entitled "NETWORK NODES AND METHODS THEREIN FOR SECONDARY RAT USAGE REPORTING" which claims priority to International Patent Application Serial No. PCT/CN2021/111172 filed Aug. 6, 2021 both of which are hereby incorporated by reference in their entirety.

TECHNICAL FIELD

The present disclosure relates to communication technology, and more particularly, to network nodes and methods therein for secondary Radio Access Technology (RAT) usage reporting.

BACKGROUND

Usage data reporting for secondary RAT is specified in Clause 5.7A.2 of the 3$^{rd}$ Generation Partnership Project (3GPP) Technical Specification (TS) 23.401, V17.0.0, which is incorporated herein by reference in its entirety, and in Clause 4.21 of the 3GPP TS 23.502, V17.0.0, which is incorporated herein by reference in its entirety.

In an active inter Mobility Management Entity (MME) or Access and Mobility Management Function (AMF) mobility procedure, e.g., an S1 based handover or an N2 based handover, after a source Radio Access Network (RAN) node transmits a Handover Command to a User Equipment (UE) to hand over the UE to a target RAN, if a secondary RAT usage reporting feature is deployed by a Public Land Mobile Network (PLMN), the source RAN will report secondary RAT usage to a source MME or AMF, and the source MME or AMF will forward the report received from the source RAN to a target MME or AMF, such that the target MME or AMF can then report the same to a Packet Data Network Gateway—Control (PGW-C) or Session Management Function (SMF).

According to TS 23.502, during an N2 based handover execution phase in the 5$^{th}$ Generation (5G) system, when a PLMN has configured secondary RAT usage reporting and a source RAN (e.g., Next Generation RAN (NG-RAN)) has secondary RAT usage data to report, the source RAN can report the secondary RAT usage data by transmitting a SECONDARY RAT DATA USAGE REPORT, including the secondary RAT usage data and a handover flag, to a source AMF. The Handover Flag indicates to the source AMF that it should buffer N2 Session Management (SM) Information containing the secondary RAT usage data before forwarding it to a target AMF.

According to TS 23.401, during an S1 based handover execution phase in the 4$^{th}$ Generation (4G) or Long Term Evolution (LTE) system, when a PLMN has configured secondary RAT usage reporting and a source evolved NodeB (eNB) has secondary RAT usage data to report, the source eNB can report the secondary RAT usage data by transmitting a RAN Usage data Report, including the secondary RAT usage data and a handover flag, to a source MME. The handover flag indicates to the source MME that it should buffer the secondary RAT usage data before forwarding it to a target MME.

SUMMARY

In a 5G to 4G handover procedure or a 4G to 5G handover procedure, there is also a need for a solution to report secondary RAT usage data to a target network node.

It is an object of the present disclosure to provide network nodes and methods therein, capable of reporting secondary RAT usage data to a target network node in a 5G to 4G handover procedure or a 4G to 5G handover procedure.

According to a first aspect of the present disclosure, a method in an AMF is provided. The method includes, in a 5$^{th}$ Generation System (5GS) to Evolved Packet System (EPS) handover procedure of a UE: receiving, from an NG-RAN node, a secondary RAT usage data report message including a Secondary RAT Usage Data Report Transfer Information Element (IE) containing secondary RAT usage data associated with the UE; and transmitting, to an MME, a message including a first IE containing the secondary RAT usage data.

In an embodiment, the message may be a Forward Relocation Complete Acknowledge message.

In an embodiment, the first IE may contain a field encoded with content of the Secondary RAT Usage Data Report Transfer IE.

In an embodiment, the first IE may further contain an indication indicating presence of the field.

In an embodiment, the first IE may further contain an EPS Bearer Identifier (EBI) associated with a Protocol Data Unit (PDU) session for the UE.

In an embodiment, the first IE may be of a type Secondary RAT Usage Data Report.

In an embodiment, the first IE may be defined as a container containing the Secondary RAT Usage Data Report Transfer IE.

In an embodiment, the secondary RAT usage data report message may further contain a handover flag.

According to a second aspect of the present disclosure, a method in an MME is provided. The method includes, in a 5GS to EPS handover procedure of a UE: receiving, from an AMF, a first message including a first IE containing secondary RAT usage data associated with the UE; and transmitting, to an SMF+PGW-C, a second message including the first IE.

In an embodiment, the first message may be a Forward Relocation Complete Acknowledge message, and/or the second message may be a Modify Bearer Request message.

In an embodiment, the first IE may contain a field encoded with content of a Secondary RAT Usage Data Report Transfer IE, and the Secondary RAT Usage Data Report Transfer IE may contain the secondary RAT usage data.

In an embodiment, the first IE may further contain an indication indicating presence of the field.

In an embodiment, the first IE may further contain an EBI associated with a PDU session for the UE.

In an embodiment, the SMF+PGW-C may serve a Packet Data Network (PDN) connection to which the PDU session is mapped.

In an embodiment, the first IE may be of a type Secondary RAT Usage Data Report.

In an embodiment, the first IE may be defined as a container containing a Secondary RAT Usage Data Report Transfer IE, and the Secondary RAT Usage Data Report Transfer IE may contain the secondary RAT usage data.

According to a third aspect of the present disclosure, a method in an SMF+PGW-C is provided. The method includes, in a 5GS to EPS handover procedure of a UE: receiving, from an MME, a message including a first IE containing secondary RAT usage data associated with the UE.

In an embodiment, the message may be a Modify Bearer Request message.

In an embodiment, the first IE may contain a field encoded with content of a Secondary RAT Usage Data Report Transfer IE, and the Secondary RAT Usage Data Report Transfer IE may contain the secondary RAT usage data.

In an embodiment, the first IE may further contain an indication indicating presence of the field.

In an embodiment, the first IE may further contain an EBI associated with a PDU session for the UE.

In an embodiment, the SMF+PGW-C may serve a PDN connection to which the PDU session is mapped.

In an embodiment, the first IE may be of a type Secondary RAT Usage Data Report.

In an embodiment, the first IE may be defined as a container containing a Secondary RAT Usage Data Report Transfer IE, and the Secondary RAT Usage Data Report Transfer IE may contain the secondary RAT usage data.

In an embodiment, the method may further include: transmitting the secondary RAT usage data to a management system associated with the 5GS.

According to a fourth aspect of the present disclosure, a method in an AMF is provided. The method includes, in an EPS to 5GS handover procedure of a UE: receiving, from an MME, a first message including a Secondary RAT Usage Data Report IE containing a secondary RAT usage data associated with the UE; and transmitting, to an SMF+PGW-C or to a visited SMF (v-SMF) or intermediate SMF (i-SMF), a second message containing the Secondary RAT Usage Data Report IE.

In an embodiment, the first message may be a Forward Relocation Complete Acknowledge message, and/or the second message may be an Update SmContext Request message.

In an embodiment, the Secondary RAT Usage Data Report IE may be contained in a container in the second message.

According to a fifth aspect of the present disclosure, a method in an SMF+PGW-C is provided. The method includes, in an EPS to 5GS handover procedure of a UE: receiving, from an AMF or a v-SMF or i-SMF, a message including a Secondary RAT Usage Data Report IE containing a secondary RAT usage data associated with the UE.

In an embodiment, the message received from the AMF may be an Update SmContext Request message, or the message received from the v-SMF or i-SMF may be a Create PDU Session Request message or an Update PDU Session Request message.

In an embodiment, the Secondary RAT Usage Data Report IE may be contained in a container in the message.

In an embodiment, the method may further include: transmitting the secondary RAT usage data to a management system associated with the EPS.

According to a sixth aspect of the present disclosure, a method in a v-SMF or i-SMF is provided. The method includes, in an EPS to 5GS handover procedure of a UE: receiving, from an AMF, a first message including a Secondary RAT Usage Data Report IE containing a secondary RAT usage data associated with the UE; and transmitting, to a home SMF (h-SMF) or SMF, a second message including the Secondary RAT Usage Data Report IE.

In an embodiment, the first message may be an Update SmContext Request message, and the second message may be a Create PDU Session Request message or an Update PDU Session Request message.

In an embodiment, the Secondary RAT Usage Data Report IE may be contained in a container in the first message and/or the second message.

According to a seventh aspect of the present disclosure, a network node is provided. The network node includes a communication interface, a processor, and a memory. The memory contains instructions executable by the processor whereby the network node is operative to, when implementing an AMF, perform the method according to the above first or fourth aspect, or when implementing an MME, perform the method according to the above second aspect, or when implementing an SMF+PGW-C, perform the method according to the above third or fifth aspect, or when implementing a v-SMF or i-SMF, perform the method according to the above sixth aspect.

According to an eighth aspect of the present disclosure, a computer-readable storage medium is provided. The computer-readable storage medium has computer-readable instructions stored thereon. The computer-readable instructions, when executed by a processor of a network node, configure the network node to, when implementing an AMF, perform the method according to the above first or fourth aspect, or when implementing an MME, perform the method according to the above second aspect, or when implementing an SMF+PGW-C, perform the method according to the above third or fifth aspect, or when implementing a v-SMF or i-SMF, perform the method according to the above sixth aspect.

With the embodiments of the present disclosure, in a 5GS to EPS or EPS to 5GS handover procedure, the secondary RAT usage data can be delivered properly.

BRIEF DESCRIPTION OF THE DRAWINGS

The above and other objects, features and advantages will be more apparent from the following description of embodiments with reference to the figures, in which:

FIG. 9 is a flowchart illustrating a method in an AMF according to another embodiment of the present disclosure;

FIG. 10 is a flowchart illustrating a method in an SMF+PGW-C according to another embodiment of the present disclosure;

FIG. 11 is a flowchart illustrating a method in a v-SMF or i-SMF according to another embodiment of the present disclosure;

DETAILED DESCRIPTION

In the present disclosure, a network function, or NF, can be implemented either as a network element on a dedicated hardware, as a software instance running on a dedicated hardware, or as a virtualized function instantiated on an appropriate platform, e.g. on a cloud infrastructure.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
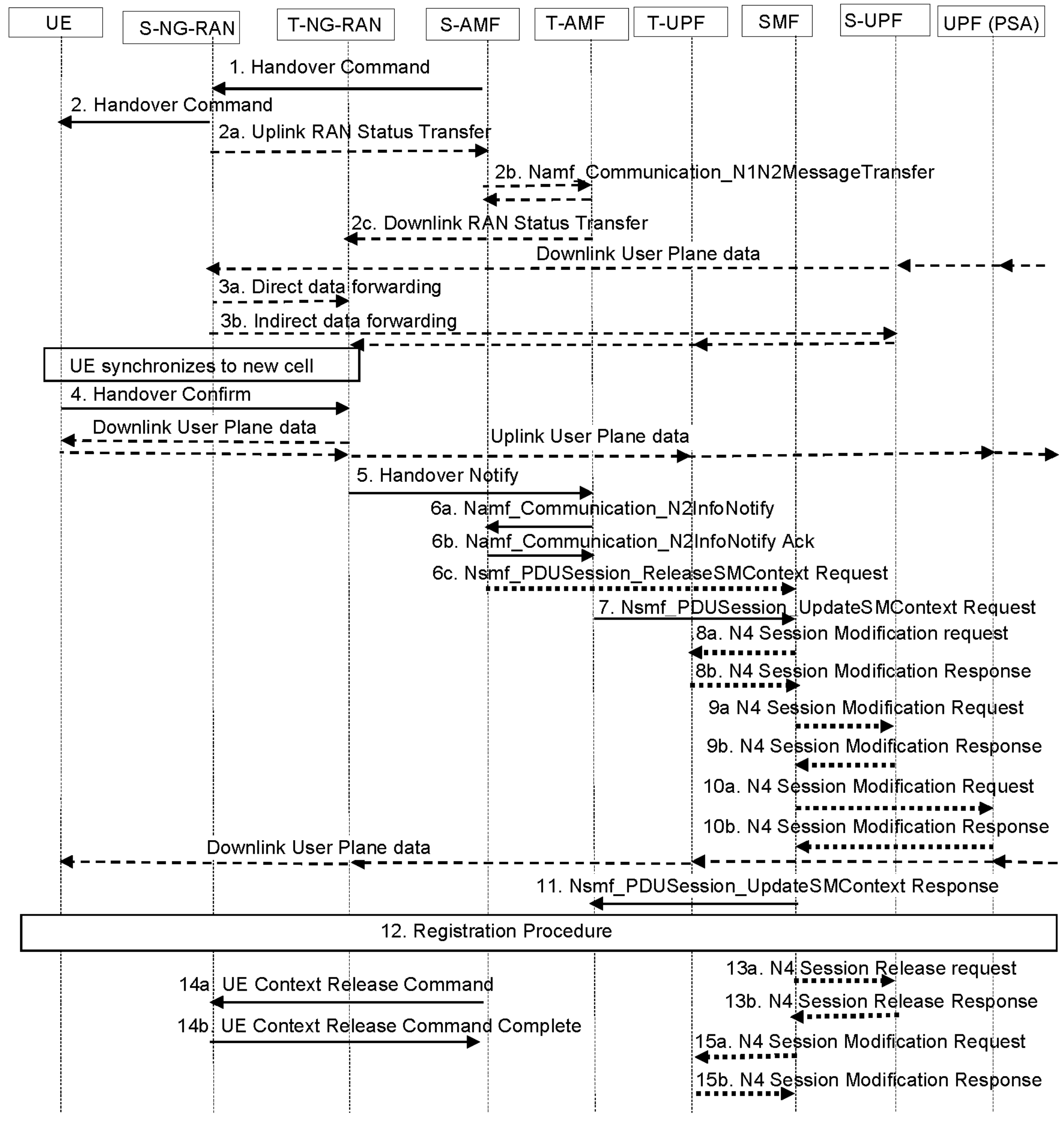
FIG. 1 is a sequence diagram showing an exemplary N2 based handover procedure.

FIG. 1 shows an execution phase of an inter NG-RAN node, N2 based handover procedure. Some steps of the procedure will be described below, and for further details, reference can be made to TS 23.502. In the following, the prefix "S-" denotes "Source" and the prefix "T-" denotes "Target".

Step 1. S-AMF to S-RAN: Handover Command (Target to Source transparent container, List Of PDU Sessions to be handed-over with N2 SM information containing information received from T-RAN during the handover preparation phase, List Of PDU Sessions failed to be setup).

Target to Source transparent container is forwarded as received from S-AMF. If Dual Active Protocol Stack (DAPS) Response information for one or more Data Radio Bearers (DRBs) is received by S-RAN and indicates that DAPS handover is accepted, the execution phase for DAPS handover procedure as described in clause 4.9.1.3.3a in TS 23.502 is performed.

The SM forwarding info list includes T-RAN SM N3 forwarding info list for direct forwarding or S-UPF SM N3 forwarding info list for indirect data forwarding.

S-RAN uses the PDU Sessions failed to be setup list and the indicated reason for failure to decide whether to proceed with the N2 Handover procedure.

If the S-RAN supports and receives a reference to an Alternative Quality of Service (QOS) Profile for an accepted QoS Flow, it shall take it into account for deciding whether or not to proceed with the N2 Handover procedure (see TS 23.501, V17.0.0).

Step 2. S-RAN to UE: Handover Command (UE container).

UE container is a UE part of the Target to Source transparent container which is sent transparently from T-RAN via AMF to S-RAN and is provided to the UE by the S-RAN.

Step **2*a*0**. If the PLMN has configured secondary RAT usage reporting and the source NG-RAN has Secondary RAT usage data to report, the source NG-RAN node may provide RAN usage data report message (N2 SM Information (Secondary RAT usage data), Handover Flag) as in clause 4.21 in TS 23.502 to the AMF. The Handover Flag indicates to the AMF that it should buffer the N2 SM Information containing the usage data report before forwarding it.

Steps **2*a*-2*c***. The S-RAN sends the Uplink RAN Status Transfer message to the S-AMF, as specified in TS 36.300 and TS 38.300. The S-RAN may omit sending this message if none of the radio bearers of the UE shall be treated with PDCP status preservation.

If there is an AMF relocation, the S-AMF sends this information to the T-AMF via the Namf_Communication_N1N2MessageTransfer service operation and the T-AMF acknowledges. The S-AMF or, if the AMF is relocated, the T-AMF, sends the information to the T-RAN via the Downlink RAN Status Transfer message, as specified in TS 36.300 and TS 38.300.

Step 3. Uplink packets are sent from T-RAN to Target User Plane Function (T-UPF) and UPF (PDU Session Anchor (PSA)). Downlink packets are sent from UPF (PSA) to S-RAN via S-UPF. The S-RAN should start forwarding of downlink data from the S-RAN towards the T-RAN for QoS Flows or DRBs subject to data forwarding. This may be either direct (step **3*a*) or indirect forwarding (step 3*b***).

Step 4. UE to T-RAN: Handover Confirm.

After the UE has successfully synchronized to the target cell, it sends a Handover Confirm message to the T-RAN. Handover is by this message considered as successful by the UE.

Step 5. T-RAN to T-AMF: Handover Notify.

Handover is by this message considered as successful in T-RAN.

Step **6*a***. [Conditional] T-AMF to S-AMF: Namf_Communication_N2InfoNotify. The T-AMF notifies to the S-AMF about the N2 handover notify received from the T-RAN by invoking the Namf_Communication_N2InfoNotify.

A timer in S-AMF is started to supervise when resources in S-RAN shall be release.

Step 6*b*. [Conditional] S-AMF to T-AMF: Namf_Communication_N2InfoNotify ACK (N2 SM Information (Secondary RAT usage data)).

The S-AMF acknowledges by sending the Namf_Communication_N2InfoNotify ACK to the T-AMF. The N2 SM Information here is the one buffered at step 2*a*0 when applicable.

6c. [Conditional] S-AMF to SMF: Nsmf_PDUSession_ReleaseSMContext Request (SM Context ID, N2 SM Information (Secondary RAT Usage Data)).

If the PDU Session(s) is not accepted by the T-AMF (e.g. Single Network Slice Selection Assistance Information (S-NSSAI) associated with the PDU Session is not available in the T-AMF), S-AMF triggers PDU Session Release procedure as specified in clause 4.3.4.2 in TS 23.502 after the S-AMF is notified for the reception of N2 Handover Notify in step 6*a*.

Step 7. T-AMF to SMF: Nsmf_PDUSession_UpdateSMContext Request (Handover Complete indication for PDU Session ID, UE presence in Local Area Data Network (LADN) service area, N2 SM Information (Secondary RAT usage data)). The N2 SM Information here is the one received at step 6*b* when applicable.

Handover Complete indication is sent per each PDU Session to the corresponding SMF to indicate the success of the N2 Handover.

When an Nsmf_PDUSession_UpdateSMContext Response message arrived too late during the handover preparation phase (see step 8 of clause 4.9.1.3.2 in TS 23.502), or the PDU Session with SMF involvement is not accepted by T-RAN, Nsmf_PDUSession_UpdateSMContext Request (SM Context ID, Operation Type) is sent to the corresponding SMF allowing the SMF to deallocate a possibly allocated N3 User Plane (UP) address and Tunnel ID of the selected UPF. A PDU Session handled by that SMF is considered deactivated and handover attempt is terminated for that PDU Session.

In the case that the AMF determines that the PDU Session is related to a LADN then the AMF provides the "UE presence in LADN service area". If the AMF does not provide the "UE presence in LADN service area" indication and the SMF determines that the DNN corresponds to a LADN, then the SMF considers that the UE is OUT of the LADN service area.

The SMF takes actions for the LADN PDU Session as defined in TS 23.501 clause 5.6.5 based on the "UE presence in LADN service area" indication.

For each QoS Flow for which the SMF has received a reference to the fulfilled Alternative QoS Profile in step 10 of clause 4.9.1.3.2 in TS 23.502, the SMF notifies the Policy Control Function (PCF) and the UE as described in TS 23.501.

Step 8*a*. [Conditional] SMF to T-UPF (intermediate): N4 Session Modification Request.

If new T-UPF is inserted or an existing intermediate S-UPF is re-allocated, the SMF shall send N4 Session Modification Request indicating Downlink (DL) Access Network (AN) Tunnel Info of T-RAN to the T-UPF.

Step 8*b*. [Conditional] T-UPF to SMF: N4 Session Modification Response.

The T-UPF acknowledges by sending N4 Session Modification Response message to SMF.

Step 9*a*. [Conditional] SMF to S-UPF (intermediate): N4 Session Modification Request.

If UPF is not re-allocated, the SMF shall send N4 Session Modification Request indicating DL AN Tunnel Info of T-RAN to the S-UPF.

Step 9*b*. [Conditional] S-UPF to SMF: N4 Session Modification Response.

The S-UPF acknowledges by sending N4 Session Modification Response message to SMF.

Step 10*a*. [Conditional] SMF to UPF (PSA): N4 Session Modification Request.

For non-roaming or local breakout roaming scenario, the SMF sends N4 Session Modification Request message to PDU Session Anchor UPF, UPF (PSA), providing N3 AN Tunnel Info of T-RAN or the DL Core Network (CN) Tunnel Info of T-UPF if a new T-UPF is inserted or an existing intermediate S-UPF is re-allocated. If redundant transmission is performed for one or more QoS Flows of the PDU Session, two N3 AN Tunnel Info of T-RAN or two DL CN Tunnel Info of two T-UPFs are provided and the SMF indicates to the UPF (PSA) one of the AN/CN Tunnel Info is used as redundancy tunnel of the PDU Session. If the existing intermediate S-UPF terminating N9 toward the H-UPF (PDU Session Anchor) is re-allocated for the home routed roaming scenario, the Visited SMF (V-SMF) invokes an Nsmf_PDUSession_Update Request (DL CN Tunnel Info) service operation toward the Home SMF (H-SMF).

In the case of the S-UPF acts as an Uplink (UL) Classifier (CL) or Branching Point (BP), the SMF indicates only one of the PDU Session Anchors to send the "end marker" packets. To ensure the "end marker" is the last user plane packet on the old path, the SMF should modify the path on other PDU Session Anchors before it indicates the PDU Session Anchor to send the "end marker" packets.

If T-UPF is not inserted or an existing intermediate S-UPF is not re-allocated, step 10*a* and step 10*b* are skipped.

Step 10*b*. [Conditional] UPF (PSA) to SMF: N4 Session Modification Response.

The UPF (PSA) sends N4 Session Modification Response message to SMF. In order to assist the reordering function in the T-RAN, the UPF (PSA) sends one or more "end marker" packets for each N3 tunnel on the old path immediately after switching the path, the source NG-RAN shall forward the "end marker" packets to the target NG-RAN. At this point, UPF (PSA) starts sending downlink packets to the T-RAN, via T-UPF if a new T-UPF is inserted or an existing intermediate S-UPF is re-allocated. In the case of home routed roaming scenario, the H-SMF responds with the Nsmf_PDUSession_Update Response service operation to V-SMF once the H-UPF (PDU Session Anchor) is updated with the UL Tunnel Info of the T-UPF.

When there are multiple UPFs (PSA), step 10*a* and step 10*b* are performed for each UPFs(PSA).

Step 11. SMF to T-AMF: Nsmf_PDUSession_UpdateSMContext Response (PDU Session ID).

SMF confirms reception of Handover Complete.

If indirect data forwarding applies, the SMF starts an indirect data forwarding timer, to be used to release the resource of indirect data forwarding tunnel.

Step 12. The UE initiates Mobility Registration Update procedure as described in clause 4.2.2.2.2 in TS 23.502.

The target AMF knows that it is a Handover procedure and therefore the target AMF performs only a subset of the Registration procedure, specifically the steps 4, 5, and 10 in the Registration procedure for the context transfer between source AMF and target AMF are skipped.

The target AMF, based on the S-NSSAIs subject to Network Slice-Specific Authentication and Authorization status information from source AMF in step 3 of clause 4.9.1.3.2 in TS 23.502, may decide to skip step 25 in the Registration procedure (i.e. Network Slice-Specific Authentication and Authorization (NSSAA) procedure) or whether to perform it if the status is pending.

Step 13*a*. [Conditional] SMF to S-UPF (intermediate): N4 Session Release Request.

If there is a source intermediate UPF, the SMF initiates resource release, after timer in step 6 or indirect data forwarding timer expires, by sending an N4 Session Release Request (Release Cause) to source UPF. This message is also used to release the indirect data forwarding resource in S-UPF.

Step 13*b*. S-UPF to SMF: N4 Session Release Response.

The S-UPF acknowledges with an N4 Session Release Response message to confirm the release of resources.

In the case of indirect data forwarding, the resource of indirect data forwarding is also released.

Step 14*a*. AMF to S-RAN: UE Context Release Command ( ).

After the timer in step 6*a* expires, the AMF sends UE Context Release Command.

Step 14*b*. S-RAN to AMF: UE Context Release Complete ( ).

The source NG-RAN releases its resources related to the UE and responds with a UE Context Release Complete ( ) message.

Step 15*a*. [Conditional] SMF to T-UPF: N4 Session Modification Request.

If indirect forwarding applies and UPF is re-allocated, after timer of indirect data forwarding expires, the SMF sends N4 Session Modification Request to T-UPF to release the indirect data forwarding resource.

Step 15*b*. [Conditional] T-UPF to SMF: N4 Session Modification Response.

The T-UPF acknowledges with an N4 Session Modification Response message to confirm the release of indirect data forwarding resources.

If the AMF is subscribed to Mobility Event by other NFs, the AMF notifies the event to the corresponding NFs by invoking the Namf_EventExposure_Notify service operation as described in clause 4.15.4.2 in TS 23.502.

Upon reception of the Namf_EventExposure_Notify with an indication that UE is reachable only for regulatory prioritized service, the SMF deactivates the PDU Session if the service of the PDU Session is not regulatory prioritized. For home routed roaming case, the V-SMF triggers the deactivation of the PDU Session, in addition, the H-SMF refrains from sending downlink signaling if the signaling is not related to regulatory prioritized service upon receiving the notification.

Figure 2:
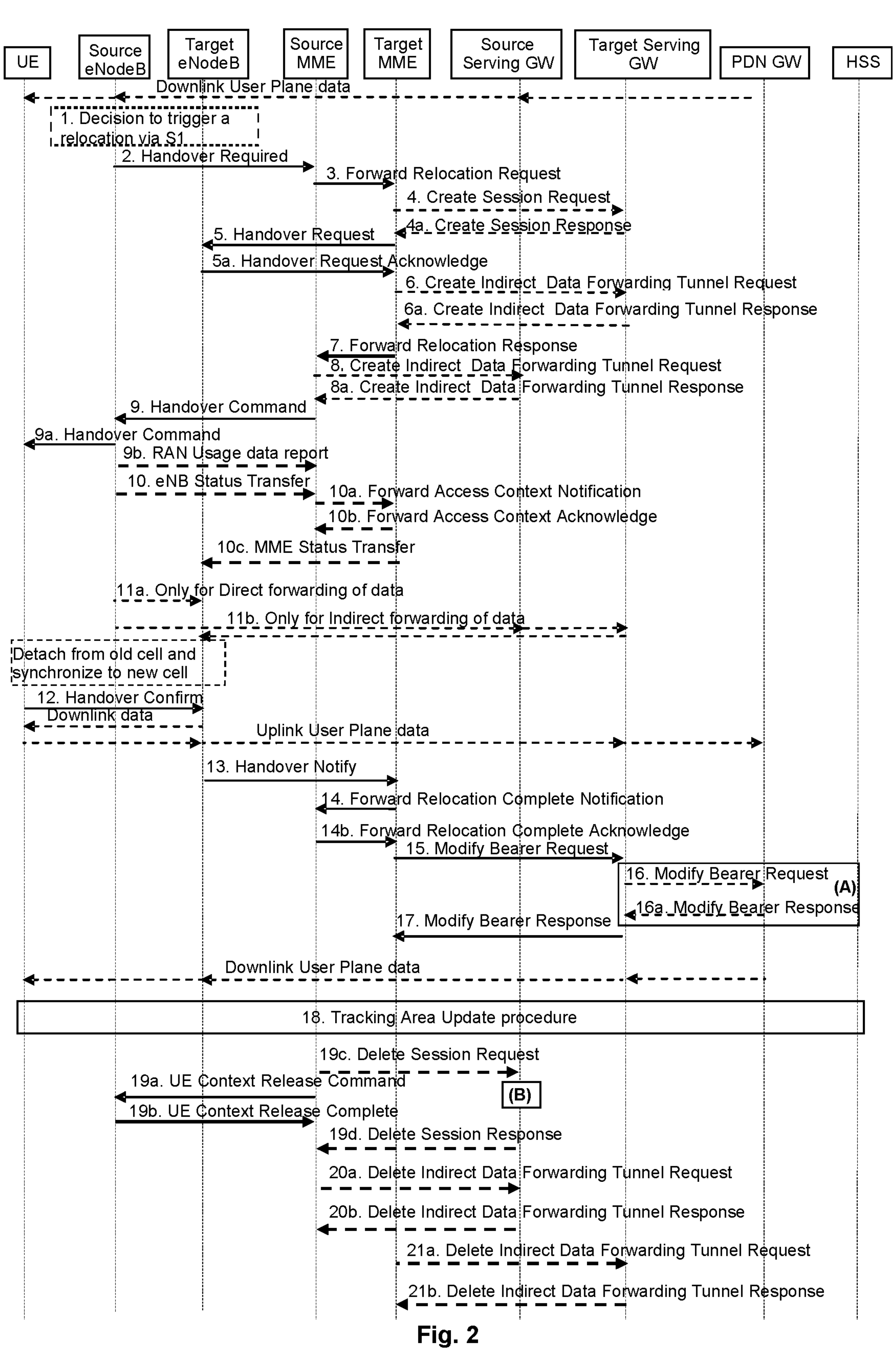
FIG. 2 is a sequence diagram showing an exemplary S1 based handover procedure.

FIG. 2 shows an execution phase of an S1 based handover procedure. Some steps of the procedure will be described below, and for further details, reference can be made to TS 23.401.

Step 1. The source eNodeB decides to initiate an S1-based handover to the target eNodeB. This can be triggered e.g. by no X2 connectivity to the target eNodeB, or by an error indication from the target eNodeB after an unsuccessful X2-based handover, or by dynamic information learnt by the source eNodeB.

Step 2. The source eNodeB sends Handover Required (Direct Forwarding Path Availability, Source to Target transparent container, target eNodeB Identity, Closed Subscriber Group (CSG) ID, CSG access mode, target Tracking Area Identifier (TAI), S1 Application Protocol (S1AP) Cause) to the source MME. The source eNodeB indicates which bearers are subject to data forwarding. Direct Forwarding Path Availability indicates whether direct forwarding is available from the source eNodeB to the target eNodeB. This indication from source eNodeB can be based on e.g. the presence of X2. The target TAI is sent to MME to facilitate the selection of a suitable target MME. When the target cell is a CSG cell or a hybrid cell, the source eNodeB shall include the CSG ID of the target cell. If the target cell is a hybrid cell, the CSG access mode shall be indicated.

Step 3. The source MME selects the target MME as described in clause 4.3.8.3 in TS 23.401 on "MME Selection Function" and if it has determined to relocate the MME, it sends a Forward Relocation Request (MME UE context, Source to Target transparent container, RAN Cause, target eNodeB Identity, CSG ID, CSG Membership Indication, target TAI, Mobile Station (MS) Info Change Reporting Action (if available), CSG Information Reporting Action (if available), UE Time Zone, Direct Forwarding Flag, Serving Network, Local Home Network ID, LTE-Machine to Machine (LTE-M) UE Indication) message to the target MME. The target TAI is sent to the target MME to help it to determine whether Serving Gateway (S-GW) relocation is needed (and, if needed, aid S-GW selection). The old Serving Network is sent to target MME to support the target MME to resolve if Serving Network is changed. In network sharing scenarios Serving Network denotes the serving core network.

The source MME shall perform access control by checking the UE's CSG subscription when CSG ID is provided by the source eNodeB. If there is no subscription data for this CSG ID or the CSG subscription is expired, and the target cell is a CSG cell, the source MME shall reject the handover with an appropriate cause unless the UE has emergency bearer services.

The MME UE context includes International Mobile Subscriber Identity (IMSI), Mobile Equipment (ME) Identity, UE security context, UE Network Capability, Aggregate Maximum Bit Rate (AMBR), Selected CN operator ID, Access Point Name (APN) restriction, Serving GW address and Tunnel Endpoint Identifier (TEID) for control signaling, and EPS Bearer context(s), UE Radio Capability ID.

An EPS Bearer context includes the PDN GW addresses and TEIDs (for GPRS Tunneling Protocol (GTP)-based S5/S8) or Generic Routing Encapsulation (GRE) keys (for Proxy Mobile Internet Protocol (PMIP)-based S5/S8) at the PDN GW(s) for uplink traffic, APN, Serving GW addresses and TEIDs for uplink traffic, and Transaction Identifier (TI).

Based on the Cellular Internet of Things (CIoT) EPS Optimisation capabilities of the target MME (determined according to the target MME selection procedure of clause 4.3.8.3 in TS 23.401) the source MME only includes the EPS Bearer Context(s) that the target MME can support. If none of the UE's EPS Bearers can be supported by the selected target MME, the source MME rejects the S1 handover attempt by sending a Handover Preparation Failure (Cause) message to the Source eNodeB. If the target MME supports CIoT EPS Optimisation and the use of header compression has been negotiated between the UE and the source MME, the source MME also includes in the Forward Relocation Request the previously negotiated Header Compression Configuration that includes the information necessary for the ROHC channel setup but not the RoHC context itself.

If the source MME includes EPS Bearer Context, in addition to the Serving GW IP address and TEID for S1-U user plane, the source MME also includes Serving GW IP address and TEID for S11-U, if available.

If Selected IP Traffic Offload (SIPTO) at the Local Network is active for a PDN connection in the architecture with stand-alone GW the source MME shall include the Local Home Network ID of the source cell in the EPS Bearer context corresponding to the SIPTO at the Local Network PDN connection.

RAN Cause indicates the SAP Cause as received from source eNodeB.

The source MME includes the CSG ID in the Forward Relocation Request when the target cell is a CSG or hybrid cell. When the target cell is a hybrid cell, or if there are one or several emergency bearers and the target cell is a CSG cell, the CSG Membership Indication indicating whether the UE is a CSG member shall be included in the Forward Relocation Request message.

The Direct Forwarding Flag indicates if direct forwarding is applied, or if indirect forwarding is going to be set up by the source side.

The target MME shall determine the Maximum APN restriction based on the APN Restriction of each bearer context in the Forward Relocation Request, and shall subsequently store the new Maximum APN restriction value.

If the UE receives only emergency services and the UE is Universal Integrated Circuit Card (UICC)-less, IMSI cannot be included in the MME UE context in Forward Relocation Request message. For emergency attached UEs, if the IMSI cannot be authenticated, then the IMSI shall be marked as unauthenticated. Also, in this case, security parameters are included only if available.

If a UE is Restricted Local Operator Service (RLOS) attached, the old MME includes an RLOS indication to the new MME. If the RLOS attached UE in the old MME does not have a Universal Subscriber Identity Module (USIM), IMSI can not be included in the Forward Relocation Request message. If the RLOS attached UE has USIM but the IMSI cannot be successfully authenticated, then the IMSI shall be marked as unauthenticated. Also, in this case, security parameters are included only if available.

If the Old MME is aware the UE is a LTE-M UE, it provides the LTE-M UE Indication to the new MME.

Step 4. If the MME has been relocated, the target MME verifies whether the source Serving GW can continue to serve the UE. If not, it selects a new Serving GW as described in clause 4.3.8.2 in TS 23.401 on "Serving GW Selection Function". If the MME has not been relocated, the source MME decides on this Serving GW re-selection.

If the source Serving GW continues to serve the UE, no message is sent in this step. In this case, the target Serving GW is identical to the source Serving GW.

If a new Serving GW is selected, the target MME sends a Create Session Request (bearer context(s) with PDN GW addresses and TEIDs (for GTP-based S5/S8) or GRE keys (for PMIP-based S5/S8) at the PDN GW(s) for uplink traffic, Serving Network, UE Time Zone) message per PDN connection to the target Serving GW. The target Serving GW allocates the S-GW addresses and TEIDs for the uplink traffic on S1_U reference point (one TEID per bearer). The target Serving GW sends a Create Session Response (Serving GW addresses and uplink TEID(s) for user plane) message back to the target MME.

Step 5. The Target MME sends Handover Request (EPS Bearers to Setup, AMBR, S1AP Cause, Source to Target transparent container, CSG ID, CSG Membership Indication, Handover Restriction List, UE Radio Capability ID) message to the target eNodeB. This message creates the UE context in the target eNodeB, including information about the bearers, and the security context. For each EPS Bearer, the Bearers to Setup includes Serving GW address and uplink TEID for user plane, and EPS Bearer QoS. If the direct forwarding flag indicates unavailability of direct forwarding and the target MME knows that there is no indirect data forwarding connectivity between source and target, the Bearers to Setup shall include "Data forwarding not possible" indication for each EPS bearer. Handover Restriction List is sent if available in the Target MME; it is described in clause 4.3.5.7 in TS 23.401 "Mobility Restrictions".

S1AP Cause indicates the RAN Cause as received from source MME.

The Target MME shall include the CSG ID and CSG Membership Indication when provided by the source MME in the Forward Relocation Request message.

The target eNodeB sends a Handover Request Acknowledge (EPS Bearer Setup list, EPS Bearers failed to setup list Target to Source transparent container) message to the target MME. The EPS Bearer Setup list includes a list of addresses and TEIDs allocated at the target eNodeB for downlink traffic on S1 U reference point (one TEID per bearer) and addresses and TEIDs for receiving forwarded data if necessary. If the UE AMBR is changed, e.g. all the EPS bearers which are associated to the same APN are rejected in the target eNodeB, the MME shall recalculate the new UE-AMBR and signal the modified UE AMBR value to the target eNodeB.

If none of the default EPS bearers have been accepted by the target eNodeB, the target MME shall reject the handover as specified in clause 5.5.1.2.3 in TS 23.401.

If the target cell is a CSG cell, the target eNodeB shall verify the CSG ID provided by the target MME, and reject the handover with an appropriate cause if it does not match the CSG ID for the target cell. If the target eNodeB is in hybrid mode, it may use the CSG Membership Indication to perform differentiated treatment for CSG and non-CSG members. If the target cell is a CSG cell, and if the CSG Membership Indication is "non member", the target eNodeB only accepts the emergency bearers.

If the MME supports RACS as defined in clause 5.11.3a in TS 23.401 and has UE Radio Capability ID stored in the UE's context it includes it in the Handover Request message, if target eNodeB supports Radio Capability Signaling (RACS).

Step 6. If indirect forwarding applies and the Serving GW is relocated, the target MME sets up forwarding parameters by sending Create Indirect Data Forwarding Tunnel Request (target eNodeB addresses and TEIDs for forwarding) to the Serving GW. The Serving GW sends a Create Indirect Data Forwarding Tunnel Response (target Serving GW addresses and TEIDs for forwarding) to the target MME. If the Serving GW is not relocated, indirect forwarding may be set up in step 8 below.

Indirect forwarding may be performed via a Serving GW which is different from the Serving GW used as the anchor point for the UE.

Step 7. If the MME has been relocated, the target MME sends a Forward Relocation Response (Cause, Target to Source transparent container, Serving GW change indication, EPS Bearer Setup List, Addresses and TEIDs) message to the source MME. For indirect forwarding, this message includes Serving GW Address and TEIDs for indirect forwarding (source or target). Serving GW change indication indicates a new Serving GW has been selected.

Step 8. If indirect forwarding applies, the source MME sends Create Indirect Data Forwarding Tunnel Request (addresses and TEIDs for forwarding) to the Serving GW. If the Serving GW is relocated it includes the tunnel identifier to the target serving GW.

The Serving GW responds with a Create Indirect Data Forwarding Tunnel Response (Serving GW addresses and TEIDs for forwarding) message to the source MME.

Indirect forwarding may be performed via a Serving GW which is different from the Serving GW used as the anchor point for the UE.

Step 9. The source MME sends a Handover Command (Target to Source transparent container, Bearers subject to forwarding, Bearers to Release) message to the source eNodeB. The Bearers subject to forwarding includes list of addresses and TEIDs allocated for forwarding. The Bearers to Release includes the list of bearers to be released.

Step 9*a*. The Handover Command is constructed using the Target to Source transparent container and is sent to the UE. Upon reception of this message the UE will remove any EPS bearers for which it did not receive the corresponding EPS radio bearers in the target cell.

Step 9*b*. If the PLMN has configured Secondary RAT usage data reporting and the source eNodeB has Secondary RAT usage data to report, the eNodeB sends a RAN Usage data Report (Secondary RAT usage data, handover flag) message to the source MME. The handover flag indicates to the MME that it should buffer the report before forwarding the Secondary RAT usage data.

Step 10. The source eNodeB sends the eNodeB Status Transfer message to the target eNodeB via the MME(s) to convey the Packet Data Convergence Protocol (PDCP) and Hyper Frame Number (HFN) status of the Evolved Radio Access Bearers (E-RABs) for which PDCP status preservation applies, as specified in TS 36.300. The source eNodeB may omit sending this message if none of the E-RABs of the UE shall be treated with PDCP status preservation.

If there is an MME relocation the source MME sends this information to the target MME via the Forward Access Context Notification message which the target MME acknowledges. The source MME or, if the MME is relocated, the target MME, sends the information to the target eNodeB via the MME Status Transfer message.

Step 11. The source eNodeB should start forwarding of downlink data from the source eNodeB towards the target eNodeB for bearers subject to data forwarding. This may be either direct (step 11*a*) or indirect forwarding (step 11*b*).

Step 12. After the UE has successfully synchronized to the target cell, it sends a Handover Confirm message to the target eNodeB. Downlink packets forwarded from the source eNodeB can be sent to the UE. Also, uplink packets can be sent from the UE, which are forwarded to the target Serving GW and on to the PDN GW.

Step 13. The target eNodeB sends a Handover Notify (TAI+Evolved Universal Terrestrial Radio Access Network (E-UTRAN) Cell Global Identifier (ECGI), Local Home Network ID) message to the target MME. If Dual Connectivity is activated for the UE, the Primary Secondary Cell (PSCell) ID shall be included in the Handover Notify message.

For SIPTO at the Local Network with stand-alone GW architecture, the target eNodeB shall include the Local Home Network ID of the target cell in the Handover Notify message.

Step 14. If the MME has been relocated, the target MME sends a Forward Relocation Complete Notification message to the source MME. The source MME in response sends a Forward Relocation Complete Acknowledge (Secondary RAT usage data) message to the target MME. The source MME includes Secondary RAT usage data in this message if it received this in step 9*b*. Regardless if MME has been relocated or not, a timer in source MME is started to supervise when resources in Source eNodeB and if the Serving GW is relocated, also resources in Source Serving GW shall be released.

Upon receipt of the Forward Relocation Complete Acknowledge message the target MME starts a timer if the target MME allocated S-GW resources for indirect forwarding.

For all bearers that were not included in the Forward Relocation Request message sent in step 3, the MME now releases them by sending a Delete Bearer Command to the SGW, or, the appropriate message to the Service Capability Exposure Function (SCEF).

Step 15. The MME sends a Modify Bearer Request (eNodeB address and TEID allocated at the target eNodeB for downlink traffic on S1 U for the accepted EPS bearers, Idle mode Signaling Reduction (ISR) Activated, Secondary RAT usage data if PGW secondary RAT usage data reporting is active, User Location Information, PSCell ID) message to the target Serving GW for each PDN connection, including the PDN connections that need to be released. If the PDN GW requested location information change reporting and/or User CSG information (determined from the UE context), the MME also includes the User Location Information IE (if it is different compared to the previously sent information) and/or User CSG Information IE in this message. If the UE Time Zone has changed, the MME includes the UE Time Zone IE in this message. If Serving GW is not relocated but the Serving Network has changed or if the MME has not received any old Serving Network information from the old MME, the MME includes the Serving Network IE in this message. For the case that neither MME nor S-GW changed, if ISR was activated before this procedure MME should maintain ISR. The UE is informed about the ISR status in the Tracking Area Update procedure. If the Serving GW supports Modify Access Bearers Request procedure and if there is no need for the SGW to send the signaling to the PDN GW, the MME may send Modify Access Bearers Request (eNodeB address and TEID allocated at the target eNodeB for downlink traffic on S1 U for the accepted EPS bearers, ISR Activated) per UE to the Serving GW to optimise the signaling. If Serving GW is not relocated and if Secondary RAT usage data was received in step 9*a*, the MME includes the Secondary RAT usage data in the message. If the Serving GW has been relocated and if PGW Secondary RAT reporting is active, the MME includes the Secondary RAT usage data and also includes a flag stating that the Serving GW should not process the information and only forward it to the PDN GW. If PSCell ID is received in step 13, the MME includes it in Modify Bearer Request message.

The MME releases the non-accepted dedicated bearers by triggering the bearer release procedure as specified in clause 5.4.4.2 in TS 23.401. If the Serving GW receives a DL packet for a non-accepted bearer, the Serving GW drops the DL packet and does not send a Downlink Data Notification to the MME.

If the default bearer of a PDN connection has not been accepted by the target eNodeB and there are other PDN connections active, the MME shall handle it in the same way as if all bearers of a PDN connection have not been accepted. The MME releases these PDN connections by triggering the MME requested PDN disconnection procedure specified in clause 5.10.3 in TS 23.401.

When the Modify Bearer Request does not indicate ISR Activated the Serving GW deletes any ISR resources by sending a Delete Bearer Request to the other CN node that has bearer resources on the Serving GW reserved.

Step 16. If the Serving GW is relocated, the target Serving GW assigns addresses and TEIDs (one per bearer) for downlink traffic from the PDN GW. It sends a Modify Bearer Request (Serving GW addresses for user plane and TEID(s), Serving Network, PDN Charging Pause Support Indication, Secondary RAT usage data) message per PDN connection to the PDN GW(s). The S-GW also includes User Location Information IE and/or UE Time Zone IE and/or User CSG Information IE if they are present in step 15. The Serving GW also includes Serving Network IE if it is present in step 4 or step 15. The Serving GW allocates DL TEIDs on S5/S8 even for non-accepted bearers. The PDN GW updates its context field and returns a Modify Bearer Response (Charging Id, Mobile Station Integrated Services Digital Network Number (MSISDN), PDN Charging Pause Enabled Indication (if PDN GW has chosen to enable the function), etc.) message to the target Serving GW. The MSISDN is included if the PDN GW has it stored in its UE context. The PDN GW starts sending downlink packets to the target GW using the newly received address and TEIDs. These downlink packets will use the new downlink path via the target Serving GW to the target eNodeB. The Secondary RAT usage data is included if it was received in step 15 and if PGW secondary RAT usage data reporting is active.

If the Serving GW is not relocated, but has received the User Location Information IE and/or UE Time Zone IE and/or User CSG Information IE and/or Serving Network IE from the MME in step 15, the Serving GW shall inform the PDN GW(s) about these information that e.g. can be used for charging, by sending the message Modify Bearer Request (User Location Information IE, UE Time Zone IE, User CSG Information IE, Serving Network IE) to the PDN GW(s) concerned. A Modify Bearer Response message is sent back to the Serving GW.

If the Serving GW is not relocated and it has not received User Location Information IE nor UE Time Zone IE nor User CSG Information IE nor Serving Network IE from the MME in step 15, no message is sent in this step and downlink packets from the Serving GW are immediately sent on to the target eNodeB.

If the Serving GW is relocated, the PDN GW shall send one or more "end marker" packets on the old path immediately after switching the path in order to assist the reordering function in the target eNodeB. The source Serving GW shall forward the "end marker" packets to the source eNodeB. If data forwarding-direct or indirect) occurs, the source eNodeB shall forward the "end marker" packets to the target eNodeB via the forwarding tunnel.

Step 17. The Serving GW shall return a Modify Bearer Response (Serving GW address and TEID for uplink traffic) message to the MME as a response to a Modify Bearer Request message, or a Modify Access Bearers Response (Serving GW address and TEID for uplink traffic) as a response to a Modify Access Bearers Request message. If the Serving GW cannot serve the MME Request in the Modify Access Bearers Request message without S5/S8 signaling other than to unpause charging in the PDN GW or without corresponding Gxc signaling when PMIP is used over the S5/S8 interface, it shall respond to the MME with indicating that the modifications are not limited to S1-U bearers, and the MME shall repeat its request using Modify Bearer Request message per PDN connection.

If the Serving GW does not change, the Serving GW shall send one or more "end marker" packets on the old path immediately after switching the path in order to assist the reordering function in the target eNodeB. If data forwarding-direct or indirect) occurs, the source eNodeB shall forward the "end marker" packets to the target eNodeB via the forwarding tunnel.

Step 18. The UE initiates a Tracking Area Update procedure when one of the conditions listed in clause "Triggers for tracking area update" applies.

For a UE supporting CIoT EPS Optimisations, the EPS bearer status information shall be included in the Tracking Area Update (TAU) Request. The MME shall then indicate the EPS bearer status to the UE in the TAU Accept and the UE shall locally release any non-transferred bearer.

The target MME knows that it is a Handover procedure that has been performed for this UE as it received the bearer context(s) by handover messages and therefore the target MME performs only a subset of the TA update procedure, specifically it excludes the context transfer procedures between source MME and target MME. In this case, the target MME shall set the Header Compression Context Status for each EPS Bearer in the TAU Accept message based on information obtained in step 3.

Step 19. When the timer started in step 14 expires the source MME sends a UE Context Release Command ( ) message to the source eNodeB. The source eNodeB releases its resources related to the UE and responds with a UE Context Release Complete ( ) message. When the timer started in step 14 expires and if the source MME received the Serving GW change indication in the Forward Relocation Response message, it deletes the EPS bearer resources by sending Delete Session Request (Cause, Linked EPS Bearer Identity (LBI), Operation Indication, Secondary RAT usage data, User Location Information, PSCell ID) messages to the Source Serving GW. The operation Indication flag is not set, that indicates to the Source Serving GW that the Source Serving GW shall not initiate a delete procedure towards the PDN GW. Secondary RAT usage data is included if it was received in step 9*b*. PSCell ID is included if it was received in step 9*b*. The Source Serving GW acknowledges with Delete Session Response ( ) messages. If ISR has been activated before this procedure, the cause indicates to the Source S-GW that the Source S-GW shall delete the bearer resources on the other old CN node by sending Delete Bearer Request message(s) to that CN node.

Step 20. If indirect forwarding was used then the expiry of the timer at source MME started at step 14 triggers the source MME to send a Delete Indirect Data Forwarding Tunnel Request message to the S-GW to release the temporary resources used for indirect forwarding that were allocated at step 8.

Step 21. If indirect forwarding was used and the Serving GW is relocated, then the expiry of the timer at target MME started at step 14 triggers the target MME to send a Delete Indirect Data Forwarding Tunnel Request message to the target S-GW to release temporary resources used for indirect forwarding that were allocated at step 6.

Figure 3:
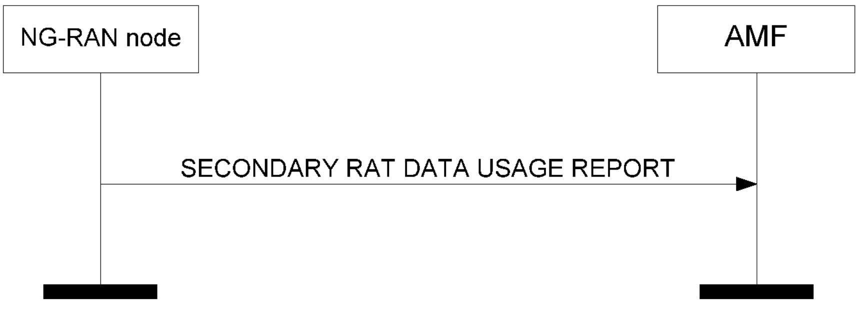
FIG. 3 is a sequence diagram showing an exemplary Secondary RAT Data Usage Report procedure.

FIG. 3 shows a Secondary RAT Data Usage Report procedure. The purpose of the Secondary RAT Data Usage Report procedure is to provide information on the used resources of the secondary RAT (e.g., New Radio (NR) resources during Multi-RAT Dual Connectivity (MR-DC) operation) as specified in TS 23.501. The procedure uses UE-associated signaling.

As shown in FIG. 3, the NG-RAN node initiates the procedure by sending the SECONDARY RAT DATA USAGE REPORT message to the AMF.

If the Handover Flag IE is included in the SECONDARY RAT DATA USAGE REPORT message, it indicates that for each PDU session the AMF should buffer the Secondary RAT Data Usage Report Transfer IE since the secondary RAT data usage report is sent due to handover as defined in TS 23.502.

For each PDU session for which the Secondary RAT Usage Information List IE is included in the Secondary RAT Data Usage Transfer IE, the SMF shall handle this information as specified in TS 23.502.

The NG-RAN node shall, if supported, report in the SECONDARY RAT DATA USAGE REPORT message location information of the UE in the User Location Information IE.

The SECONDARY RAT DATA USAGE REPORT message is sent by the NG-RAN node to report Secondary RAT data usage and is defined in Table 1 below:

TABLE 1

SECONDARY RAT DATA USAGE REPORT
Direction: NG-RAN → AMF

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| AMF UE NGAP ID | M | | 9.3.3.1 | | YES | ignore |
| RAN UE NGAP ID | M | | 9.3.3.2 | | YES | ignore |
| PDU Session Resource Secondary RAT Usage List | | 1 | | | YES | ignore |
| >PDU Session Resource Secondary RAT Usage Item | | 1 . . . <maxnoofPDUSessions> | | | — | |
| >>PDU Session ID | M | | 9.3.1.50 | | — | |
| >>Secondary RAT Data Usage Report Transfer | M | | OCTET STRING | Containing the Secondary RAT Data Usage Report Transfer IE specified in subclause 9.3.4.23 | — | |
| Handover Flag | O | | ENUMERATED (handover_ preparation, . . . ) | | YES | ignore |
| User Location Information | O | | 9.3.1.16 | | YES | ignore |

| Range bound | Explanation |
|---|---|
| maxnoofPDUSessions | Maximum no. of PDU sessions allowed towards one UE. Value is 256. |

For further details of the SECONDARY RAT DATA USAGE REPORT message, reference can be made to the 3GPP TS 38.413, V16.6.0, which is incorporated herein by reference in its entirety.

According to the 3GPP TS 29.502, V17.1.0, which is incorporated herein by reference in its entirety, the N2 SM Information shall encode NG Application Protocol (NGAP) IEs, as specified in clause 9.3 in TS 38.413 (Abstract Syntax Notation One (ASN.1) encoded), using the vnd.3gpp.ngap content-type.

N2 SM Information may encode any NGAP SMF related IE specified in 3GPP TS 38.413, as summarized in Table 2 below.

TABLE 2

N2 SM Information content

| N2 SM IE | Reference (3GPP TS 38.413) | Related NGAP message |
|---|---|---|
| PDU Session Resource Setup Request Transfer | 9.3.4.1 | PDU SESSION RESOURCE SETUP REQUEST<br>INITIAL CONTEXT SETUP REQUEST<br>HANDOVER REQUEST |
| PDU Session Resource Setup Response Transfer | 9.3.4.2 | PDU SESSION RESOURCE SETUP RESPONSE<br>INITIAL CONTEXT SETUP RESPONSE |
| PDU Session Resource Setup Unsuccessful Transfer | 9.3.4.16 | PDU SESSION RESOURCE SETUP RESPONSE<br>INITIAL CONTEXT SETUP RESPONSE |
| PDU Session Resource Release Command Transfer | 9.3.4.12 | PDU SESSION RESOURCE RELEASE COMMAND |
| PDU Session Resource Release Response Transfer | 9.3.4.21 | PDU SESSION RESOURCE RELEASE RESPONSE |
| PDU Session Resource Modify Request Transfer | 9.3.4.3 | PDU SESSION RESOURCE MODIFY REQUEST |

TABLE 2-continued

| N2 SM Information content | | |
|---|---|---|
| N2 SM IE | Reference (3GPP TS 38.413) | Related NGAP message |
| PDU Session Resource Modify Response Transfer | 9.3.4.4 | PDU SESSION RESOURCE MODIFY RESPONSE |
| PDU Session Resource Modify Unsuccessful Transfer | 9.3.4.17 | PDU SESSION RESOURCE MODIFY RESPONSE |
| PDU Session Resource Notify Transfer | 9.3.4.5 | PDU SESSION RESOURCE NOTIFY |
| PDU Session Resource Notify Released Transfer | 9.3.4.13 | PDU SESSION RESOURCE NOTIFY |
| PDU Session Resource Modify Indication Transfer | 9.3.4.6 | PDU SESSION RESOURCE MODIFY INDICATION |
| PDU Session Resource Modify Confirm Transfer | 9.3.4.7 | PDU SESSION RESOURCE MODIFY CONFIRM |
| PDU Session Resource Modify Indication Unsuccessful Transfer | 9.3.4.22 | PDU SESSION RESOURCE MODIFY CONFIRM |
| Path Switch Request Transfer | 9.3.4.8 | PATH SWITCH REQUEST |
| Path Switch Request Setup Failed Transfer | 9.3.4.15 | PATH SWITCH REQUEST |
| Path Switch Request Acknowledge Transfer | 9.3.4.9 | PATH SWITCH REQUEST ACKNOWLEDGE |
| Path Switch Request Unsuccessful Transfer | 9.3.4.20 | PATH SWITCH REQUEST ACKNOWLEDGE<br>PATH SWITCH REQUEST FAILURE |
| Handover Required Transfer | 9.3.4.14 | HANDOVER REQUIRED |
| Handover Request Acknowledge Transfer | 9.3.4.11 | HANDOVER REQUEST ACKNOWLEDGE |
| Handover Resource Allocation Unsuccessful Transfer | 9.3.4.19 | HANDOVER REQUEST ACKNOWLEDGE |
| Handover Command Transfer | 9.3.4.10 | HANDOVER COMMAND |
| Handover Preparation Unsuccessful Transfer | 9.3.4.18 | HANDOVER COMMAND |
| Secondary RAT Data Usage Report Transfer | 9.3.4.23 | SECONDARY RAT DATA USAGE REPORT |

According to 3GPP TS 29.274, V17.2.0, which is incorporated herein by reference in its entirety, a Forward Relocation Complete Acknowledge message shall be sent as a response to Forward Relocation Complete Notification. Table 3 below specifies the presence requirements and conditions of the IEs in the message.

TABLE 3

| Information Elements in a Forward Relocation Complete Acknowledge | | | | |
|---|---|---|---|---|
| Information elements | P | Condition/Comment | IE Type | Ins. |
| Cause | M | | Cause | 0 |
| Recovery | O | | Recovery | 0 |
| Secondary RAT Usage Data Report | CO | If the PLMN has configured secondary RAT usage reporting, the MME shall include this IE on the S10 interface if it has received Secondary RAT usage data from the eNodeB in an S1-based handover with MME relocation.<br>Several IEs with the same type and instance value may be included, to represent multiple usage data reports. | Secondary RAT Usage Data Report | 0 |
| Private Extension | O | | Private Extension | VS |

Figure 4:
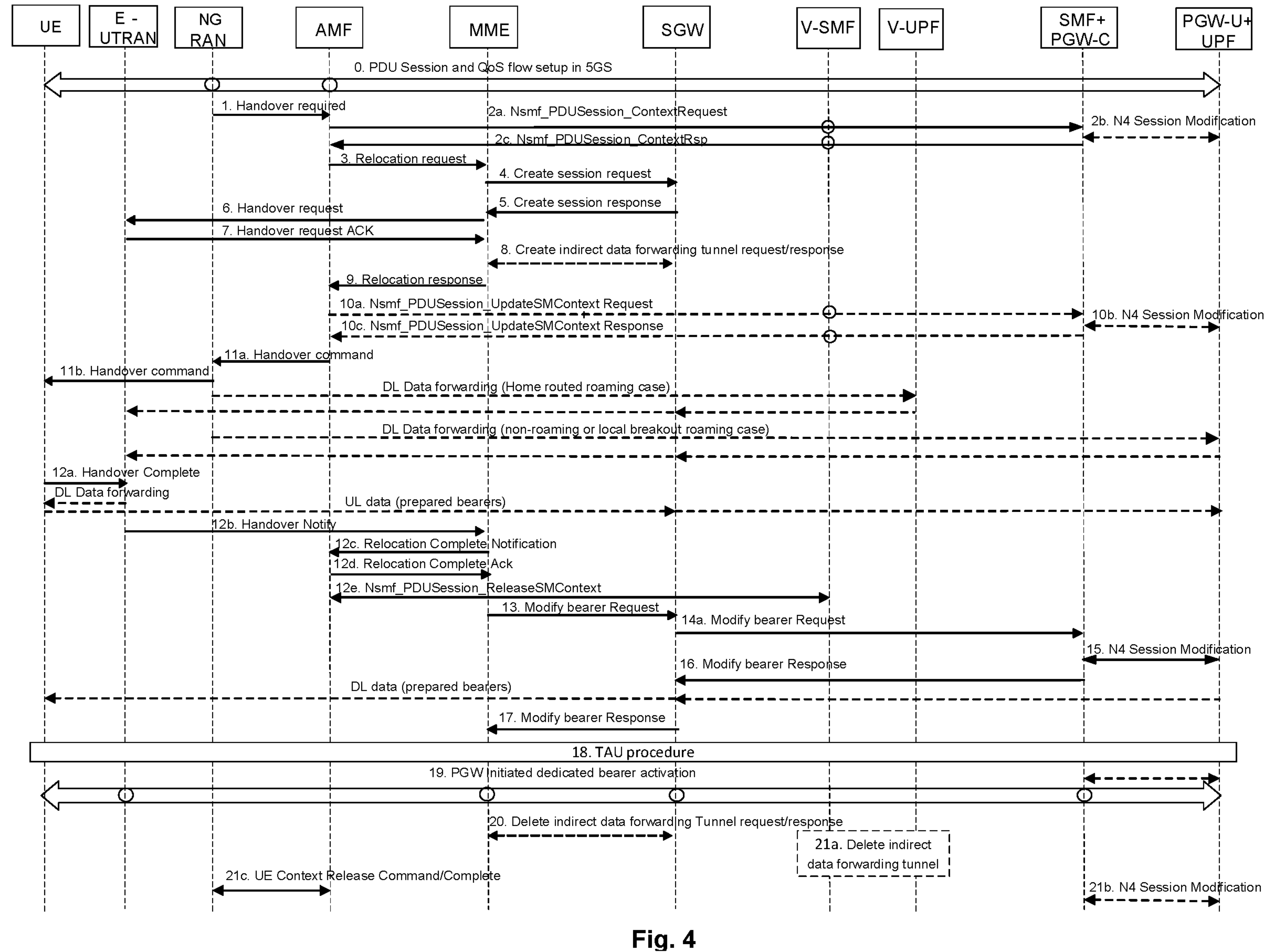
FIG. 4 is a sequence diagram showing a 5GS to EPS handover procedure.

FIG. 4 shows a handover procedure from 5GS to EPS when N26 is supported. Some steps of the procedure will be described below, and for further details, reference can be made to TS 23.502.

In the case of handover to a shared EPS network, the source NG-RAN determines a PLMN to be used in the target network as specified by TS 23.501. The source NG-RAN shall indicate the selected PLMN ID to be used in the target network to the AMF as part of the TAI sent in the Handover (HO) Required message.

In the case of handover from a shared NG-RAN, the AMF may provide the MME with an indication that the 5GS PLMN is a preferred PLMN at later change of the UE to a 5GS shared networks.

During the handover procedure, as specified in clause 4.9.1.3.1 in TS 23.502, the source AMF shall reject any SMF+PGW-C initiated N2 request received since handover procedure started and shall include an indication that the request has been temporarily rejected due to handover procedure in progress.

Upon reception of a rejection for an SMF+PGW-C initiated N2 request(s) with an indication that the request has been temporarily rejected due to handover procedure in progress, the SMF+PGW-C behaves as specified in TS 23.401.

The procedure involves a handover to EPC and setup of default EPS bearer and dedicated bearers for QoS Flows that have EBI assigned, in EPC in steps 1-16 and re-activation, if required, of dedicated EPS bearers for non-GBR QOS Flows that have no EBI assigned, in step 19. This procedure can be triggered, for example, due to new radio conditions, load balancing or in the presence of QOS Flow for normal voice or IMS emergency voice, the source NG-RAN node may trigger handover to EPC.

For Ethernet and Unstructured PDU Session Types, the PDN Type Ethernet and non-IP respectively are used, when supported, in EPS.

When EPS supports PDN Type non-IP but not PDN type Ethernet, PDN type non-IP is used also for Ethernet PDU sessions. The SMF shall also set the PDN Type of the EPS Bearer Context to non-IP in this case. After the handover to EPS, the PDN Connection will have PDN Type non-IP, but it shall be locally associated in UE and SMF to PDU Session Type Ethernet or Unstructured respectively.

In the roaming home routed case, the SMF+PGW-C always provides the EPS Bearer ID and the mapped QoS parameters to UE. The V-SMF caches the EPS Bearer ID and the mapped QoS parameters obtained from H-SMF for this PDU session. This also applies in the case that the HPLMN operates the interworking procedure without N26.

Step 1. NG-RAN decides that the UE should be handed over to the E-UTRAN. If NG-RAN is configured to perform Inter RAT mobility due to IMS voice fallback triggered by QoS flow setup and request to setup QoS flow for IMS voice was received, NG-RAN responds indicating rejection of the QoS flow establishment because of mobility due to fallback for IMS voice via N2 SM information and triggers handover to E-UTRAN. The NG-RAN sends a Handover Required (Target eNB ID, Direct Forwarding Path Availability, Source to Target Transparent Container, inter system handover indication) message to the AMF. NG-RAN indicates bearers corresponding to the 5G QoS Flows for data forwarding in Source to Target Transparent Container.

If the source NG RAN and target E-UTRAN support RACS as defined in TS 23.501, the Source to Target transparent container need not carry the UE radio access capabilities (instead the UE Radio Capability ID is supplied from the CN to the target E-UTRAN). However, if the source NG-RAN has knowledge that the target E-UTRAN might not have a local copy of the Radio Capability corresponding to the UE Radio Capability ID (i.e. because the source NG-RAN had itself to retrieve the UE's Radio Capability from the AMF) then the source NG-RAN may also send some (or all) of the UE's Radio Capability to the target E-UTRAN (the size limit based on configuration). In the case of inter-PLMN handover, when the source NG-RAN and target E-UTRAN support RACS as defined in TS 23.501 and TS 23.401, and the source NG-RAN determines that the target PLMN does not support the UE Radio Capability ID assigned by the source PLMN based on local configuration, then the source NG-RAN includes the UE radio access capabilities in the Source to Target transparent container.

Direct Forwarding Path Availability indicates whether direct forwarding is available from the NG-RAN to the E-UTRAN. This indication from NG-RAN can be based on e.g. the presence of IP connectivity and security association(s) between the NG-RAN and the E-UTRAN.

If the handover is triggered due to Emergency fallback, the NG-RAN may forward the Emergency indication to the target eNB in the Source to Target Transparent Container, and the target eNB allocates radio bearer resources taking received indication into account.

Steps 2*a*-2*c*. The AMF determines from the 'Target eNB Identifier' IE that the type of handover is Handover to E-UTRAN. The AMF selects an MME as described in TS 23.401 clause 4.3.8.3.

The AMF determines for a PDU Session whether to retrieve context including mapped UE EPS PDN Connection from the V-SMF (in the case of HR roaming) or the SMF+PGW-C (in the case of non roaming or Local Break Out (LBO) roaming) as follows:

- If the AMF determines that one or more of the EBI(s) can be transferred, the AMF sends Nsmf_PDUSession_ContextRequest to the V-SMF or SMF+PGW-C and includes in the message EBI value(s) if any that cannot be transferred.
- The EBI values(s) that cannot be transferred is determined by the AMF if the target MME does not support 15 EPS bearers, i.e. the AMF determines the EBI values in range 1-4 as not to be transferred to EPS, and if there are still more than 8 EBI values associated with PDU Sessions, the AMF then determines EBI value(s) not to be transferred to EPS based on S-NSSAI and ARP as specified in clause 5.17.2.2.1 in TS 23.501.
- The AMF does not retrieve the context for a PDU Session that cannot be transferred to EPS due to no EBI allocated, or allocated EBIs not transferrable, or combination of the two.

When the AMF sends Nsmf_PDUSession_ContextRequest the AMF provides also the target MME capability to the V-SMF or the SMF+PGW-C to allow it to determine whether to include EPS Bearer context for Ethernet PDN Type or non-IP PDN Type or not.

When Nsmf_PDUSession_Context Request is received in the V-SMF or the SMF+PGW-C, the V-SMF or the SMF+PGW-C provides context that includes the mapped EPS PDN Connection as follows:

- If there is EBI list not to be transferred, and the EBI value of the QoS Flow associated with the default QoS Rule is included in that list, the V-SMF or the SMF+PGW-C shall not return the PDN Connection context (which implies the whole PDU Session is not transferred to EPS), otherwise if the EBI value of the QoS Flow associated with the default QoS Rule is not included in EBI list not to be transferred, the V-SMF or PGW C+SMF shall not provide the EPS bearer context(s) mapped from QoS Flow(s) associated with the EBI list not to be transferred.
- For PDU Sessions with PDU Session Type Ethernet, if the UE and target MME supports Ethernet PDN type, the V-SMF or the PGW C+SMF provides Context for Ethernet PDN Type, otherwise if the target MME does not support Ethernet Type but support non-IP Type, the V-SMF or the PGW C+SMF provides Context for non-IP PDN Type. For PDU Sessions with PDU Session Type Unstructured, the V-SMF or the SMF+PGW-C provides Context for non-IP PDN Type.

In the case of non roaming or LBO roaming, when Nsmf_PDUSession_ContextRequest is received in PGW C+SMF, if the SMF+PGW-C determines that EPS Bearer Context can be transferred to EPS and the CN Tunnel Info for EPS bearer(s) have not been allocated before, the SMF+PGW-C sends N4 Session modification to the PGW-User (PGW-U)+UPF to establish the CN tunnel for each EPS bearer and provides EPS Bearer Contexts to AMF, as described in step 8 of clause 4.11.1.4.1 in TS 23.502. The PGW-U+UPF is ready to receive the uplink packet from E-UTRAN.

This step is performed with all the SMF+PGW-Cs corresponding to PDU Sessions of the UE which are associated with 3GPP access and have at least one EBI(s) determined to be transferred to EPS.

In home routed roaming scenario, the UE's EPS PDN Contexts are obtained from the V-SMF. If Small Data Rate Control applies on PDU Session, the V-SMF retrieves the SM Context, including Small Rate Control Status information from the H-SMF using Nsmf_PDUSession_Context Request.

Step 3. The AMF sends a Forward Relocation Request as in step 3 in clause 5.5.1.2.2 (S1-based handover, normal) in TS 23.401, with the following modifications and clarifications:

Parameter "Return preferred" may be included. Return preferred is an optional indication by the MME of a preferred return of the UE to the 5GS PLMN at a later access change to a 5GS shared network. An MME may use this information as specified by TS 23.501.

The SGW address and TEID for both the control-plane or EPS bearers in the message are such that target MME selects a new SGW.

The AMF determines, based on configuration and the Direct Forwarding Path Availability, the Direct Forwarding Flag to inform the target MME whether direct data forwarding is applicable.

The AMF includes the mapped SM EPS UE Contexts for PDU Sessions with and without active User Plane (UP) connections.

Subject to operator policy if the secondary RAT access restriction condition is the same for EPS and 5GS, the AMF may set EPS secondary RAT access restriction condition based on the UE's subscription data.

Steps 4-5. Step 4 and 4*a* respectively in clause 5.5.1.2.2 (S1-based handover, normal) in TS 23.401.

Step 6. Step 5 (Handover Request) in clause 5.5.1.2.2 (S1-based handover, normal) in TS 23.401 with the following modification:

Handover Request may contain information Handover Restriction List with information about PLMN IDs as specified by TS 23.251, clause 5.2a for eNodeB functions.

The target eNB should establish E-RABs indicated by the list of EPS bearer to be setup provided by the MME, even if they are not included in the source to target container.

Steps 7-9. Step 5*a* through 7 in clause 5.5.1.2.2 (S1-based handover, normal) in TS 23.401.

Step 10*a*. If data forwarding applies, the AMF sends the Nsmf_PDUSession_UpdateSMContext Request (data forwarding information) to the SMF+PGW-C. If multiple SMF+PGW-Cs serves the UE, the AMF maps the EPS bearers for Data forwarding to the SMF+PGW-C address(es) based on the association between the EPS bearer ID(s) and PDU Session ID(s). In home-routed roaming case, the AMF requests the V-SMF to create indirect forwarding tunnel if indirect forwarding applies.

Step 10*b*. If indirect data forwarding applies, the SMF+PGW-C may select an intermediate PGW-U+UPF for data forwarding. The SMF+PGW-C maps the EPS bearers for Data forwarding to the 5G QoS flows based on the association between the EPS bearer ID(s) and QFI(s) for the QoS flow(s) in the SMF+PGW-C, and then sends the QFIs, Serving GW Address(es) and TEID(s) for data forwarding to the PGW-U+UPF. The CN Tunnel Info is provided by the PGW-U+UPF to SMF+PGW-C in this response. In home-routed roaming case, the V-SMF selects the V-UPF for data forwarding.

Step 10*c*. The SMF+PGW-C returns an Nsmf_PDUSession_UpdateSMContext Response (Cause, Data Forwarding tunnel Info, QoS flows for Data Forwarding). Based on the correlation between QoS Flow ID(s) (QFI(s)) and Serving GW Address(es) and TEID(s) for data forwarding, the PGW-U+UPF maps the QoS flow(s) into the data forwarding tunnel(s) in Evolved Packet Core (EPC).

Step 11. The AMF sends the Handover Command to the source NG-RAN (Transparent container (radio aspect parameters that the target eNB has set-up in the preparation phase), Data forwarding tunnel info, QoS flows for Data Forwarding). The source NG-RAN commands the UE to handover to the target Access Network by sending the HO Command. The UE correlates the ongoing QoS Flows with the indicated EPS Bearer IDs to be setup in the HO command. The UE locally deletes the PDU Session if the QoS Flow associated with the default QoS rule in the PDU Session does not have an EPS Bearer ID assigned. If the QoS Flow associated with the default QoS rule has an EPS Bearer ID assigned, the UE keeps the PDU Session (PDN connection) and for the remaining QoS Flow(s) that do not have EPS bearer ID(s) assigned, the UE locally deletes the QoS rule(s) and the QoS Flow level QoS parameters if any associated with those QoS Flow(s) and notifies the impacted applications that the dedicated QoS resource has been released. The UE deletes any UE derived QoS rules. The EPS Bearer ID that was assigned for the QoS flow of the default QoS rule in the PDU Session becomes the EPS Bearer ID of the default bearer in the corresponding PDN connection.

If indirect data forwarding is applied, Data forwarding tunnel info includes CN tunnel info for data forwarding per PDU session. For the QoS Flows indicated in the "QoS Flows for Data Forwarding", NG-RAN initiate data forwarding via to the PGW-U+UPF based on the CN Tunnel Info for Data Forwarding per PDU Session. Then the PGW-U+UPF maps data received from the data forwarding tunnel(s) in the 5GS to the data forwarding tunnel(s) in EPS, and sends the data to the target eNodeB via the Serving GW.

If direct data forwarding is applied, Data forwarding tunnel info includes E-UTRAN tunnel info for data forwarding per EPS bearer. NG-RAN initiate data forwarding to the target E-UTRAN based on the Data Forwarding Tunnel Info for Data Forwarding per EPS bearer.

Steps 12-12*c*. Step 13 to step 14 from clause 5.5.1.2.2 (S1-based handover, normal) in TS 23.401 with the following clarification:

The AMF requests the release of the PDU Session which is associated with 3GPP access and not expected to be transferred to EPC, i.e. the AMF requests the release of:

PDU Session(s) whose corresponding SMF+PGW-C(s) are not contacted by AMF for SM context because the AMF determines that none of EBI(s) for the PDU Session can be transferred to EPS at step 2*a*; and PDU Session(s) for which the SM context retrieval failed at step 2*c*.

Step 12*d*. The AMF acknowledges MME with Relocation Complete Ack message. A timer in AMF is started to supervise when resource in NG-RAN shall be released.

Step 12*e*. In the case of home routed roaming, the AMF invokes Nsmf_PDUSession_ReleaseSMContext Request (V-SMF only indication) to the V-SMF. This service operation request the V-SMF to remove only the SM context in V-SMF, i.e. not release PDU Session context in the SMF+PGW-C.

If indirect forwarding tunnel(s) were previously established, the V-SMF starts a timer and releases the SM context on expiry of the timer. If no indirect forwarding tunnel has been established, the V-SMF immediately releases the SM context and its UP resources for this PDU Session in V-UPF locally.

Step 13. Step 15 from clause 5.5.1.2.2 (S1-based handover, normal) in TS 23.401.

Step 14*a*. Step 16 (Modify Bearer Request) from clause 5.5.1.2.2 (S1-based handover, normal) in TS 23.401 with the following clarification:

If the PDU Session (PDN connection) has QoS Flows that do not have EPS bearer ID(s) assigned, or QoS Flow(s) for which the mapped EPS bearers are not included in Modify Bearer Request, the SMF+PGW-C deletes the PCC rule(s) associated with those QoS Flows and informs the PCF about the removed PCC rule(s).

The SMF+PGW-C may need to report some subscribed event to the PCF by performing an SMF initiated SM Policy Association Modification procedure as defined in clause 4.16.5 in TS 23.502.

Step 15. The SMF+PGW-C initiates a N4 Session Modification procedure towards the UPF+PGW-U to update the User Plane path, i.e. the downlink User Plane for the indicated PDU Session is switched to E-UTRAN. The SMF+PGW-C releases the resource of the CN tunnel for PDU Session in UPF+PGW-U.

Step 16. Step 16*a* (Modify Bearer Response) from clause 5.5.1.2.2 (S1-based handover, normal) in TS 23.401. At this stage the User Plane path is established for the default bearer and the dedicated EPS bearers between the UE, target eNodeB, Serving GW and the PGW-U+UPF. The SMF+PGW-C uses the EPS QOS parameters as assigned for the dedicated EPS bearers during the QoS Flow establishment. SMF+PGW-C maps all the other IP flows to the default EPS bearer.

If indirect forwarding tunnel(s) were previously established, the SMF+PGW-C starts a timer, to be used to release the resource used for indirect data forwarding.

Step 17. Step 17 from clause 5.5.1.2.2 (S1-based handover, normal) in TS 23.401.

Step 18. The UE initiates a Tracking Area Update procedure as specified in step 18 of clause 5.5.1.2.2 (S1-based handover, normal) in TS 23.401.

This includes the deregistration of the old AMF for 3GPP access from the HSS+Unified Data Management (UDM) as specified in clause 4.11.1.5.3 in TS 23.502. Any registration associated with the non-3GPP access in the old AMF is not removed (i.e. an AMF that was serving the UE over both 3GPP and non-3GPP accesses does not consider the UE as deregistered over non 3GPP access and will remain registered and subscribed to subscription data updates in UDM).

When the UE decides to deregister over non-3GPP access or the old AMF decides not to maintain a UE registration for non-3GPP access anymore, the old AMF then deregisters from UDM by sending a Nudm_UECM_Deregistration service operation, unsubscribes from Subscription Data updates by sending an Nudm_SDM_Unsubscribe service operation to UDM and releases all the AMF and AN resources related to the UE.

Step 19. If Policy and Charging Control (PCC) is deployed, the PCF may decide to provide the previously removed PCC rules to the SMF+PGW-C again thus triggering the SMF+PGW-C to initiate dedicated bearer activation procedure. This procedure is specified in TS 23.401, clause 5.4.1 with modification captured in clause 4.11.1.5.4 in TS 23.502. This step is applicable for PDN Type IP or Ethernet, but not for non-IP PDN Type.

Step 20. Step 21 from clause 5.5.1.2.2 (S1-based handover, normal) in TS 23.401.

Step 21. In the case of home routed roaming, at the expiry of the timer at V-SMF started at step 12*e*, the V-SMF locally releases the SM context and the UP resource for the PDU Session including the resources used for indirect forwarding tunnel(s) that were allocated at step 10.

In non-roaming or local breakout roaming, if SMF+PGW-C has started a timer in step 16, at the expiry of the timer, the SMF+PGW-C sends N4 Session Modification Request to PGW-U+UPF to release the resources used for the indirect forwarding tunnel(s) that were allocated at step 10.

When the timer set in step 12*d* expires, AMF also sends a UE Context Release Command message to the source NG RAN. The source NG RAN releases its resources related to the UE and responds with a UE Context Release Complete message.

Figure 5:
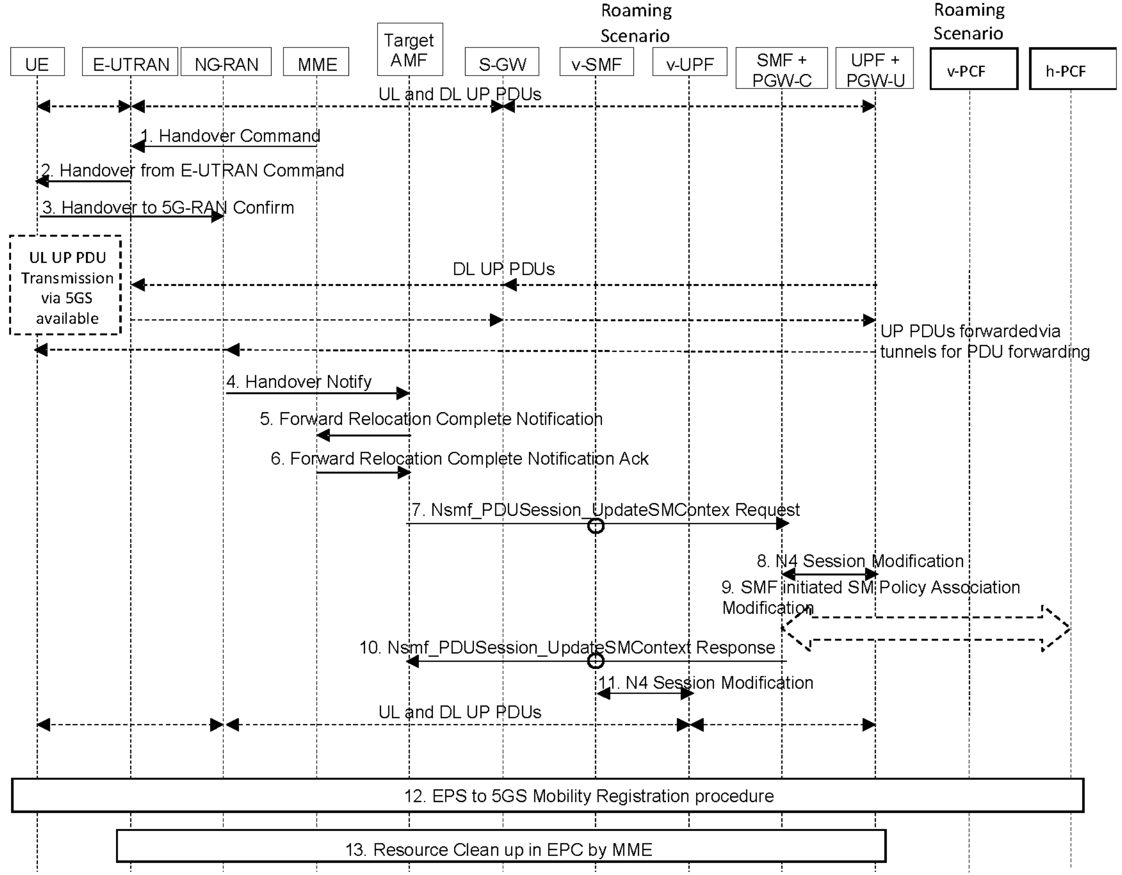
FIG. 5 is a sequence diagram showing an EPS to 5GS handover procedure.

FIG. 5 shows a handover procedure from EPS to 5GS. Some steps of the procedure will be described below, and for further details, reference can be made to TS 23.502.

Steps 1-2. Steps 9-11 from clause 5.5.1.2.2 (S1-based handover, normal) in TS 23.401. Different from step 9*a* of clause 5.5.1.2.2 (S1-based handover, normal) in TS 23.401, upon reception of Handover Command, the UE will keep the QoS Flow context for which it did not receive the corresponding radio resources in the NG-RAN until the QoS Flow is released by the network using PDU Session Modification procedure in clause 4.3.3 in TS 23.502. If the QoS Flow with a default QoS Rule of a PDU Session does not have the corresponding radio resources in the NG-RAN, UE considers that the user plane of this PDU Session is deactivated.

Step 3. Handover Confirm: the UE confirms handover to the NG-RAN.

The UE moves from the E-UTRAN and synchronizes with the target NG-RAN. The UE may resume the uplink transmission of user plane data only for those QFIs and Session IDs for which there are radio resources allocated in the NG-RAN.

The E-UTRAN sends DL data to the Data Forwarding address received in step 1. If the indirect data forwarding is applied, the E-UTRAN forward the DL data to NG-RAN via the SGW and the v-UPF. The v-UPF forwards the data packets to the NG-RAN using the N3 Tunnel Info for data forwarding, adding the QFI information. The target NG-RAN prioritizes the forwarded packets over the fresh packets for those QoS flows for which it had accepted data forwarding.

If Direct data forwarding is applied, the E-UTRAN forwards the DL data packets to the NG-RAN via the direct data forwarding tunnel.

Step 4. Handover Notify: the NG-RAN notifies to the target AMF that the UE is handed over to the NG-RAN.

Step 5. Then the target AMF knows that the UE has arrived to the target side and informs the MME by sending a Forward Relocation Complete Notification message.

Step 6. Step 14 from clause 5.5.1.2.2 (S1-based handover, normal) in TS 23.401.

Step 7. Target AMF to SMF+PGW-C (V-SMF in the case of roaming and Home-routed case): Nsmf_PDUSession_UpdateSMContext Request (Handover Complete Indication for PDU Session ID). In the Home-routed roaming case, the V-SMF invokes Nsmf_PDUSession_Update Request (V-CN Tunnel Info, Handover Complete Indication) to SMF+PGW-C.

Handover Complete Indication is sent per each PDU Session to the corresponding SMF+PGW-C (sent by V-SMF in the roaming and Home-routed case) to indicate the success of the N2 Handover.

If indirect forwarding is used, a timer in SMF+PGW-C (V-SMF in the case of roaming and Home-routed case) is started to supervise when resources in UPF (for indirect data forwarding) shall be released.

Step 8. The SMF+PGW-C updates the UPF+PGW-U with the V-CN Tunnel Info, indicating that downlink User Plane for the indicated PDU Session is switched to NG-RAN or V-UPF in the case of roaming in Home-routed case and the CN tunnels for EPS bearers corresponding to the PDU session can be released.

For each EPS Bearer one or more "end marker" is sent to Serving GW by the UPF+PGW-U immediately after switching the path. The UPF+PGW-U starts sending downlink packets to the V-UPF.

Step 9. If PCC infrastructure is used, the SMF+PGW-C informs the PCF about the change of, for example, the RAT type and UE location.

Step 10. SMF+PGW-C to target AMF: Nsmf_PDUSession_UpdateSMContext Response (PDU Session ID).

SMF+PGW-C confirms reception of Handover Complete.

If the SMF has not yet registered for this PDU Session ID, then the SMF registers with the UDM using Nudm_UECM_Registration (Subscriber Permanent Identifier (SUPI), Data Network Name (DNN), PDU Session ID) for a given PDU Session as in step 4 of PDU Session Establishment Procedure in clause 4.3.2 in TS 23.502.

Step 11. For home-routed roaming scenario: The V-SMF provides to the v-UPF with the N3 DL AN Tunnel Info. This step is executed after step 7.

Step 12. The UE performs the EPS to 5GS Mobility Registration Procedure from step 2 in clause 4.11.1.3.3 in TS 23.502. The UE includes the UE Policy Container containing the list of Policy Section Identifiers (PSIs), indication of UE support for Access Network Discovery & Selection Policy (ANDSP) and Operating System Identity (OSId) if available. If the UE holds a native 5G-Globally Unique Temporary UE Identity (GUTI) it also includes the native 5G-GUTI as an additional GUTI in the Registration Request. The UE shall select the 5G-GUTI for the additional GUTI as follows, listed in decreasing order of preference:

- a native 5G-GUTI assigned by the PLMN to which the UE is attempting to register, if available;
- a native 5G-GUTI assigned by an equivalent PLMN to the PLMN to which the UE is attempting to register, if available;
- a native 5G-GUTI assigned by any other PLMN, if available.

The additional GUTI enables the target AMF to find the UE's 5G security context (if available). The target AMF provides NG-RAN with a PLMN list in the Handover Restriction List containing at least the serving PLMN, taking into account of the last used EPS PLMN ID and Return preferred indication as part of the Registration procedure execution and target AMF signaling to NG-RAN. The Handover Restriction List contains a list of PLMN IDs as specified by TS 23.501.

Step 13. Step 19 from clause 5.5.1.2.2 (S1-based handover, normal) in TS 23.401. Step 20*a*-20*b* from clause 5.5.1.2.2 (S1-based handover, normal) in TS 23.401, with the following modification:

According to configuration, for the PDN connections which are anchored in a standalone PGW, the MME initiates PDN connection release procedure as specified in TS 23.401.

Step 14. If indirect forwarding was used, then the expiry of the timer started at step 7 triggers the SMF+PGW-C (V-SMF in the case of roaming and Home-routed case) to release temporary resources used for indirect forwarding that were allocated at steps 11 to 13 in clause 4.11.1.2.2.2 in TS 23.502.

Figures 6, 7, 8:
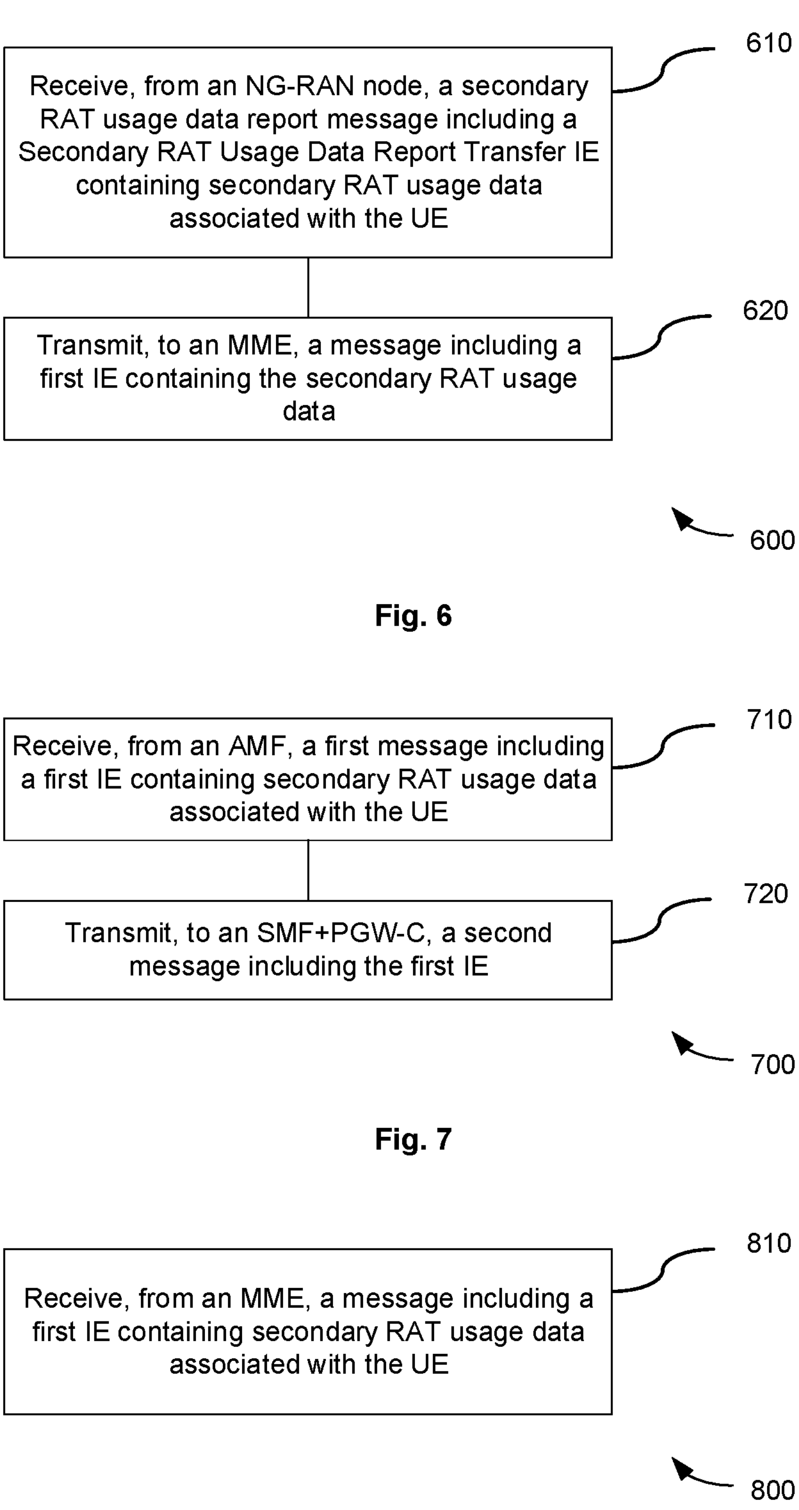
FIG. 6 is a flowchart illustrating a method in an AMF according to an embodiment of the present disclosure.
FIG. 7 is a flowchart illustrating a method in an MME according to an embodiment of the present disclosure.
FIG. 8 is a flowchart illustrating a method in an SMF+PGW-C according to an embodiment of the present disclosure.

FIG. 6 is a flowchart illustrating a method 600 according to an embodiment of the present disclosure. The method 600 can be performed at an AMF or a network node implementing an AMF, in a 5GS to EPS handover procedure of a UE, e.g., the 5GS to EPS handover procedure as shown in FIG. 4. The method 600 may be performed e.g., after the AMF transmitting a handover command to an NG-RAN node at Step 11*a* in FIG. 4.

At block 610, the AMF receives, from the NG-RAN node, a secondary RAT usage data report message including a Secondary RAT Usage Data Report Transfer IE containing secondary RAT usage data associated with the UE.

Here, the secondary RAT usage data report message may be the SECONDARY RAT DATA USAGE REPORT message shown in FIG. 3, which may include a handover flag, as defined Table 1 above.

At block 620, the AMF transmits, to an MME, a message including a first IE containing the secondary RAT usage data.

In an example, the message may be a Forward Relocation Complete Acknowledge message, as described at Step 12*d* in FIG. 4.

In an example, the first IE may be of a type Secondary RAT Usage Data Report, as defined in Table 4 below.

TABLE 4

SECONDARY RAT DATA USAGE REPORT

| Octets | Bits 8 | 7 | 6 | 5 | 4 | 3 | 2 | 1 |
|---|---|---|---|---|---|---|---|---|
| 1 | Type = 201 (decimal) | | | | | | | |
| 2 to 3 | Length = n | | | | | | | |
| 4 | Spare | | | | Instance | | | |
| 5 | Spare | | | | | SRUDN | IRSGW | IRPGW |
| 6 | Secondary RAT Type | | | | | | | |
| 7 | Spare (all bits set to 0) | | | | EPS Bearer ID (EBI) | | | |
| 8-11 | Start timestamp | | | | | | | |
| 12-15 | End timestamp | | | | | | | |
| 16-23 | Usage Data DL | | | | | | | |
| 24-31 | Usage Data UL | | | | | | | |
| 32-a | Secondary RAT Data Usage Report Transfer | | | | | | | |
| (a + 1) to (n + 4) | These octet(s) is/are present only if explicitly specified | | | | | | | |

The first IE may contain a field (e.g., Secondary RAT Data Usage Report Transfer field in Table 4) encoded with content of the Secondary RAT Usage Data Report Transfer IE in the secondary RAT usage data report message received from the NG-RAN node. The first IE may further contain an indication (e.g., SRUDN, standing for Secondary RAT Usage Data Report from NG-RAN, in Table 4) which, when set, indicates presence of the Secondary RAT Data Usage Report Transfer field in the first IE. The first IE may further contain an EBI field set to an EBI associated with a PDU session for the UE. Here, in the 5GS to EPS handover procedure, the PDU session in the 5GS (before the handover) is mapped to a PDN connection in the EPS (after the handover), and an EBI is associated with (or is used to identify) both the PDU session and the PDN connection.

Alternatively, the first IE may be defined as a container containing the Secondary RAT Usage Data Report Transfer IE in the secondary RAT usage data report message received from the NG-RAN node. Here the container may be a newly defined container or an existing container (e.g., a Fully Qualified Container).

FIG. 7 is a flowchart illustrating a method 700 according to an embodiment of the present disclosure. The method 700 can be performed at an MME or a network node implementing an MME, in a 5GS to EPS handover procedure of a UE, e.g., the 5GS to EPS handover procedure as shown in FIG. 4.

At block 710, the MME receives, from an AMF, a first message including a first IE containing secondary RAT usage data associated with the UE.

Here, the first message may be a Forward Relocation Complete Acknowledge message, as described at Step 12*d* in FIG. 4.

In an example, the first IE may be of a type Secondary RAT Usage Data Report, as defined in the above Table 4.

The first IE may contain a field (e.g., Secondary RAT Data Usage Report Transfer field in Table 4) encoded with content of a Secondary RAT Usage Data Report Transfer IE containing the secondary RAT usage data. The first IE may further contain an indication (e.g., SRUDN in Table 4) which, when set, indicates presence of the Secondary RAT Data Usage Report Transfer field in the first IE. The first IE may further contain an EBI field set to an EBI associated with a PDU session for the UE.

Alternatively, the first IE may be defined as a container containing the Secondary RAT Usage Data Report Transfer IE.

At block 720, the MME transmits, to an SMF+PGW-C, a second message including the first IE.

Here, the second message may be a Modify Bearer Request message, as described at Step 13 in FIG. 4. For example, the Modify Bearer Request message may be forwarded via an S-GW (at Step 14*a* in FIG. 4). The SMF+PGW-C may be an SMF+PGW-C serving a PDN connection to which the PDU session (associated with the EBI indicated in the EBI field in the first IE) is mapped.

FIG. 8 is a flowchart illustrating a method 800 according to an embodiment of the present disclosure. The method 800 can be performed at an SMF+PGW-C or a network node implementing an SMF+PGW-C, in a 5GS to EPS handover procedure of a UE, e.g., the 5GS to EPS handover procedure as shown in FIG. 4.

At block 810, the SMF+PGW-C receives, from an MME, a message including a first IE containing secondary RAT usage data associated with the UE.

Here, the message may be a Modify Bearer Request message, as described at Step 13 in FIG. 4. For example, the Modify Bearer Request message may be forwarded via an S-GW (at Step 14*a* in FIG. 4).

In an example, the first IE may be of a type Secondary RAT Usage Data Report, as defined in the above Table 4.

The first IE may contain a field (e.g., Secondary RAT Data Usage Report Transfer field in Table 4) encoded with content of a Secondary RAT Usage Data Report Transfer IE containing the secondary RAT usage data. The first IE may further contain an indication (e.g., SRUDN in Table 4) which, when set, indicates presence of the Secondary RAT Data Usage Report Transfer field in the first IE. The first IE may further contain an EBI field set to an EBI associated with a PDU session for the UE.

Alternatively, the first IE may be defined as a container containing the Secondary RAT Usage Data Report Transfer IE.

In an example, the SMF+PGW-C may be an SMF+PGW-C serving a PDN connection to which the PDU session is mapped.

In an example, the SMF+PGW-C may further transmit the secondary RAT usage data to a management system associated with the 5GS, e.g., an Operation & Maintenance (O&M) or charging system associated with the PDU session.

FIG. 9 is a flowchart illustrating a method 900 according to an embodiment of the present disclosure. The method 900 can be performed at an AMF or a network node implementing an AMF, in an EPS to 5GS handover procedure of a UE, e.g., the EPS to 5GS handover procedure as shown in FIG. 5.

At block 910, the AMF receives, from an MME, a first message including a Secondary RAT Usage Data Report IE containing a secondary RAT usage data associated with the UE.

Here, the first message may a Forward Relocation Complete Acknowledge message, as described at Step 6 in FIG. 5. The Secondary RAT Usage Data Report IE may be the Secondary RAT Usage Data Report IE defined in Table 3 above.

At block 920, the AMF transmits, to an SMF+PGW-C or to a v-SMF or i-SMF, a second message containing the Secondary RAT Usage Data Report IE.

Here, the second message may be an Update SmContext Request message, as described at Step 7 in FIG. 5.

In an example, the Secondary RAT Usage Data Report IE may be contained in a container in the second message. For example, the container may be a newly defined container, e.g., SecondaryRatUsageDataReportContainer.

FIG. 10 is a flowchart illustrating a method 1000 according to an embodiment of the present disclosure. The method 1000 can be performed at an SMF+PGW-C or a network node implementing an SMF+PGW-C, in an EPS to 5GS handover procedure of a UE, e.g., the EPS to 5GS handover procedure as shown in FIG. 5.

At block 1010, the SMF+PGW-C receives, from an AMF or a v-SMF or i-SMF, a message including a Secondary RAT Usage Data Report IE containing a secondary RAT usage data associated with the UE.

In an example, the message received from the AMF may be an Update SmContext Request message, as described at Step 7 in FIG. 5, or the message received from the v-SMF or i-SMF may be a Create PDU Session Request message or an Update PDU Session Request message. The Secondary RAT Usage Data Report IE may be the Secondary RAT Usage Data Report IE defined in Table 3 above.

In an example, the Secondary RAT Usage Data Report IE may be contained in a container in the message. For example, the container may be a newly defined container, e.g., SecondaryRatUsageDataReportContainer.

In an example, the SMF+PGW-C may transmit the secondary RAT usage data to a management system associated with the EPS, e.g., an O&M or charging system associated with a PDN connection for the UE.

FIG. 11 is a flowchart illustrating a method 1100 according to an embodiment of the present disclosure. The method 1100 can be performed at a v-SMF or i-SMF or a network node implementing a v-SMF or i-SMF, in an EPS to 5GS handover procedure of a UE, e.g., the EPS to 5GS handover procedure as shown in FIG. 5.

At block 1110, the v-SMF or i-SMF receives, from an AMF, a first message including a Secondary RAT Usage Data Report IE containing a secondary RAT usage data associated with the UE.

In an example, the first message may be an Update SmContext Request message, as described at Step 7 in FIG. 5. The Secondary RAT Usage Data Report IE may be the Secondary RAT Usage Data Report IE defined in Table 3 above.

At block 1120, the v-SMF or i-SMF transmits, to an h-SMF or SMF, a second message including the Secondary RAT Usage Data Report IE.

In an example, the second message may be a Create PDU Session Request message or an Update PDU Session Request message.

In an example, the Secondary RAT Usage Data Report IE may be contained in a container in the first message and/or the second message. For example, the container may be a newly defined container, e.g., SecondaryRatUsageDataReportContainer.

Figure 12:
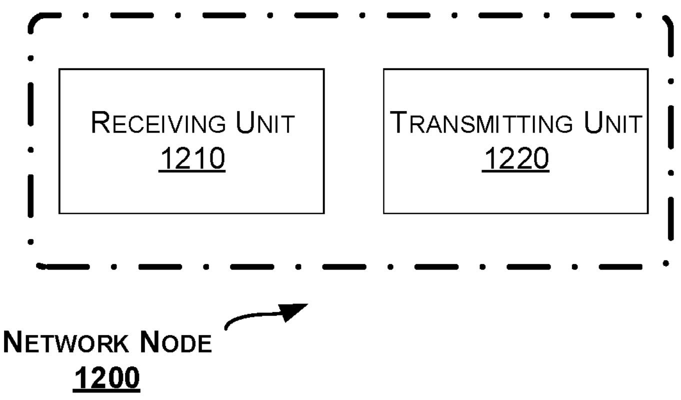
FIG. 12 is a block diagram of a network node according to an embodiment of the present disclosure.

Correspondingly to the method 600 or 900 as described above, a network node is provided. FIG. 12 is a block diagram of a network node 1200 according to an embodiment of the present disclosure. The network node 1200 can be configured to implement an AMF.

The network node 1200 is operative to perform the method 600 as described above in connection with FIG. 6, in a 5GS to EPS handover procedure of a UE. The network node 1200 includes a receiving unit 1210 configured to receive, from an NG-RAN node, a secondary RAT usage data report message including a Secondary RAT Usage Data Report Transfer IE containing secondary RAT usage data associated with the UE. The network node 1200 further includes a transmitting unit 1210 configured to transmit, to an MME, a message including a first IE containing the secondary RAT usage data.

In an embodiment, the message may be a Forward Relocation Complete Acknowledge message.

In an embodiment, the first IE may contain a field encoded with content of the Secondary RAT Usage Data Report Transfer IE.

In an embodiment, the first IE may further contain an indication indicating presence of the field.

In an embodiment, the first IE may further contain an EBI associated with a PDU session for the UE.

In an embodiment, the first IE may be of a type Secondary RAT Usage Data Report.

In an embodiment, the first IE may be defined as a container containing the Secondary RAT Usage Data Report Transfer IE.

In an embodiment, the secondary RAT usage data report message may further contain a handover flag.

Alternatively, the network node 1200 is operative to perform the method 900 as described above in connection with FIG. 9, in an EPS to 5GS handover procedure of a UE. The network node 1200 includes a receiving unit 1210 configured to receive, from an MME, a first message including a Secondary RAT Usage Data Report IE containing a secondary RAT usage data associated with the UE. The network node 1200 further includes a transmitting unit 1220 configured to transmit, to an SMF+PGW-C or to a v-SMF or i-SMF, a second message containing the Secondary RAT Usage Data Report IE.

In an embodiment, the first message may be a Forward Relocation Complete Acknowledge message, and/or the second message may be an Update SmContext Request message.

In an embodiment, the Secondary RAT Usage Data Report IE may be contained in a container in the second message.

The units 1210 and 1220 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 6 or 9.

Figure 13:
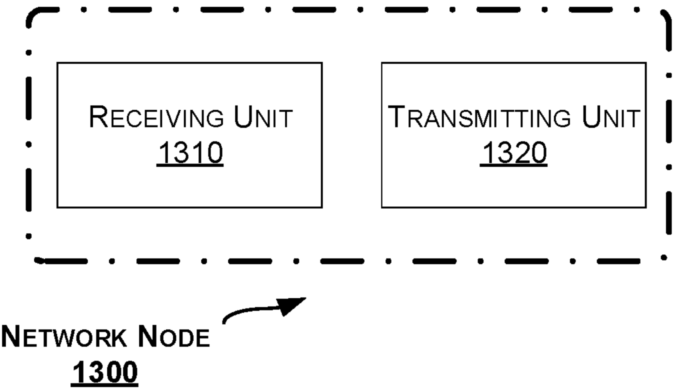
FIG. 13 is a block diagram of a network node according to another embodiment of the present disclosure.

Correspondingly to the method 700 as described above, a network node is provided. FIG. 13 is a block diagram of a network node 1300 according to an embodiment of the present disclosure. The network node 1300 can be configured to implement an MME.

The network node 1300 is operative to perform the method 700 as described above in connection with FIG. 7, in a 5GS to EPS handover procedure of a UE. The network node 1300 includes a receiving unit 1310 configured to receive, from an AMF, a first message including a first IE containing secondary RAT usage data associated with the UE. The network node 1300 further includes a transmitting unit 1320 configured to transmit, to an SMF+PGW-C, a second message including the first IE.

In an embodiment, the first message may be a Forward Relocation Complete Acknowledge message, and/or the second message may be a Modify Bearer Request message.

In an embodiment, the first IE may contain a field encoded with content of a Secondary RAT Usage Data Report Transfer IE, and the Secondary RAT Usage Data Report Transfer IE may contain the secondary RAT usage data.

In an embodiment, the first IE may further contain an indication indicating presence of the field.

In an embodiment, the first IE may further contain an EBI associated with a PDU session for the UE.

In an embodiment, the SMF+PGW-C may serve a PDN connection to which the PDU session is mapped.

In an embodiment, the first IE may be of a type Secondary RAT Usage Data Report.

In an embodiment, the first IE may be defined as a container containing a Secondary RAT Usage Data Report Transfer IE, and the Secondary RAT Usage Data Report Transfer IE may contain the secondary RAT usage data.

The units 1310 and 1320 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 7.

Figure 14:
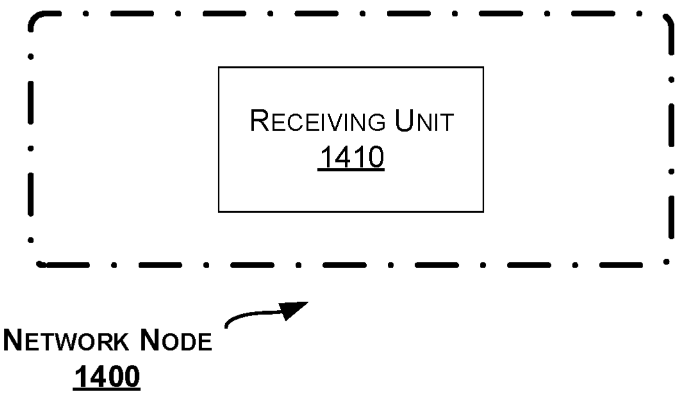
FIG. 14 is a block diagram of a network node according to yet another embodiment of the present disclosure.

Correspondingly to the method 800 or 1000 as described above, a network node is provided. FIG. 14 is a block diagram of a network node 1400 according to an embodiment of the present disclosure. The network node 1400 can be configured to implement an SMF+PGW-C.

The network node 1400 is operative to perform the method 800 as described above in connection with FIG. 8, in a 5GS to EPS handover procedure of a UE. The network node 1400 includes a receiving unit 1410 configured to receive, from an MME, a message including a first IE containing secondary RAT usage data associated with the UE.

In an embodiment, the message may be a Modify Bearer Request message.

In an embodiment, the first IE may contain a field encoded with content of a Secondary RAT Usage Data Report Transfer IE, and the Secondary RAT Usage Data Report Transfer IE may contain the secondary RAT usage data.

In an embodiment, the first IE may further contain an indication indicating presence of the field.

In an embodiment, the first IE may further contain an EBI associated with a PDU session for the UE.

In an embodiment, the SMF+PGW-C may serve a PDN connection to which the PDU session is mapped.

In an embodiment, the first IE may be of a type Secondary RAT Usage Data Report.

In an embodiment, the first IE may be defined as a container containing a Secondary RAT Usage Data Report Transfer IE, and the Secondary RAT Usage Data Report Transfer IE may contain the secondary RAT usage data.

In an embodiment, the network node 1400 may further include a transmitting unit configured to transmit the secondary RAT usage data to a management system associated with the 5GS.

Alternatively, the network node 1400 is operative to perform the method 1000 as described above in connection with FIG. 10, in an EPS to 5GS handover procedure of a UE. The network node 1400 includes a receiving unit 1410 configured to receive, from an AMF or a v-SMF or i-SMF, a message including a Secondary RAT Usage Data Report IE containing a secondary RAT usage data associated with the UE.

In an embodiment, the message received from the AMF may be an Update SmContext Request message, or the message received from the v-SMF or i-SMF may be a Create PDU Session Request message or an Update PDU Session Request message.

In an embodiment, the Secondary RAT Usage Data Report IE may be contained in a container in the message.

In an embodiment, the network node 1400 may further include a transmitting unit configured to transmit the secondary RAT usage data to a management system associated with the EPS.

The unit 1410 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 8 or 10.

Figure 15:
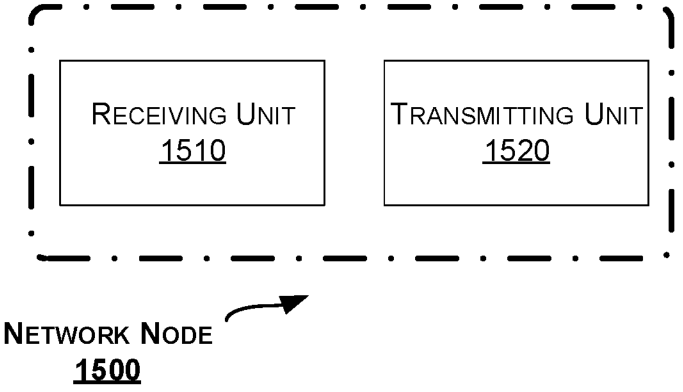
FIG. 15 is a block diagram of a network node according to still another embodiment of the present disclosure.

Correspondingly to the method 1100 as described above, a network node is provided. FIG. 15 is a block diagram of a network node 1500 according to an embodiment of the present disclosure. The network node 1500 can be configured to implement a v-SMF or i-SMF.

The network node 1500 is operative to perform the method 1100 as described above in connection with FIG. 11, in an EPS to 5GS handover procedure of a UE. The network node 1500 includes a receiving unit 1510 configured to receive, from an AMF, a first message including a Secondary RAT Usage Data Report IE containing a secondary RAT usage data associated with the UE. The network node 1500 further includes a transmitting unit 1520 configured to transmit, to an h-SMF or SMF, a second message including the Secondary RAT Usage Data Report IE.

In an embodiment, the first message may be an Update SmContext Request message, and the second message may be a Create PDU Session Request message or an Update PDU Session Request message.

In an embodiment, the Secondary RAT Usage Data Report IE may be contained in a container in the first message and/or the second message.

The units 1510 and 1520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 11.

Figure 16:
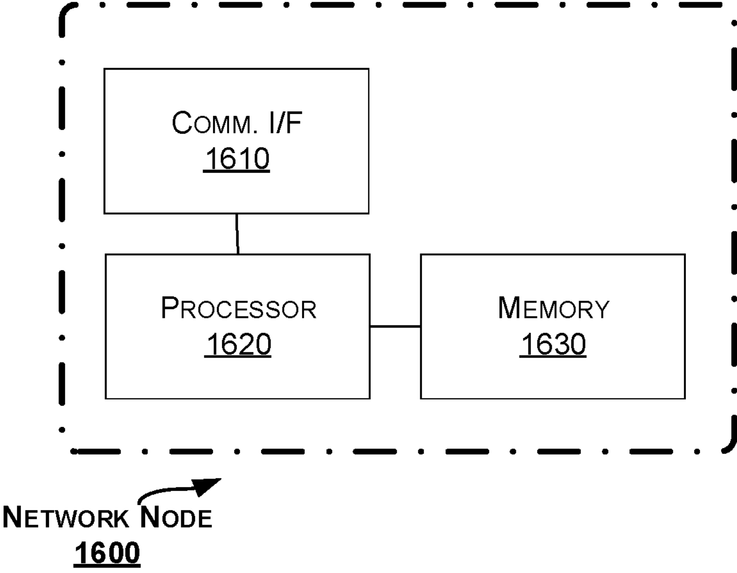
FIG. 16 is a block diagram of a network node according to still yet another embodiment of the present disclosure.

FIG. 16 is a block diagram of a network node 1600 according to another embodiment of the present disclosure. The network node 1600 includes a communication interface 1610, a processor 1620 and a memory 1630.

The memory 1630 may contain instructions executable by the processor 1620 whereby the network node 1600 is operative to, when implementing an AMF, perform the actions, e.g., of the procedure described earlier in conjunction with FIG. 6. Particularly, the memory 1630 may contain instructions executable by the processor 1620 whereby the network node 1600 is operative to, when implementing an AMF, in a 5GS to EPS handover procedure of a UE: receive, from an NG-RAN node, a secondary RAT usage data report message including a Secondary RAT Usage Data Report Transfer IE containing secondary RAT usage data associated with the UE; and transmit, to an MME, a message including a first IE containing the secondary RAT usage data.

In an embodiment, the message may be a Forward Relocation Complete Acknowledge message.

In an embodiment, the first IE may contain a field encoded with content of the Secondary RAT Usage Data Report Transfer IE.

In an embodiment, the first IE may further contain an indication indicating presence of the field.

In an embodiment, the first IE may further contain an EBI associated with a PDU session for the UE.

In an embodiment, the first IE may be of a type Secondary RAT Usage Data Report.

In an embodiment, the first IE may be defined as a container containing the Secondary RAT Usage Data Report Transfer IE.

In an embodiment, the secondary RAT usage data report message may further contain a handover flag.

Alternatively, the memory 1630 may contain instructions executable by the processor 1620 whereby the network node 1600 is operative to, when implementing an MME, perform the actions, e.g., of the procedure described earlier in conjunction with FIG. 7. Particularly, the memory 1630 may contain instructions executable by the processor 1620 whereby the network node 1600 is operative to, when implementing an MME, in a 5GS to EPS handover procedure of a UE: receive, from an AMF, a first message including a first IE containing secondary RAT usage data associated with the UE; and transmit, to an SMF+PGW-C, a second message including the first IE.

In an embodiment, the first message may be a Forward Relocation Complete Acknowledge message, and/or the second message may be a Modify Bearer Request message.

In an embodiment, the first IE may contain a field encoded with content of a Secondary RAT Usage Data Report Transfer IE, and the Secondary RAT Usage Data Report Transfer IE may contain the secondary RAT usage data.

In an embodiment, the first IE may further contain an indication indicating presence of the field.

In an embodiment, the first IE may further contain an EBI associated with a PDU session for the UE.

In an embodiment, the SMF+PGW-C may serve a Packet Data Network (PDN) connection to which the PDU session is mapped.

In an embodiment, the first IE may be of a type Secondary RAT Usage Data Report.

In an embodiment, the first IE may be defined as a container containing a Secondary RAT Usage Data Report Transfer IE, and the Secondary RAT Usage Data Report Transfer IE may contain the secondary RAT usage data.

Alternatively, the memory 1630 may contain instructions executable by the processor 1620 whereby the network node 1600 is operative to, when implementing an SMF+PGW-C, perform the actions, e.g., of the procedure described earlier in conjunction with FIG. 8. Particularly, the memory 1630 may contain instructions executable by the processor 1620 whereby the network node 1600 is operative to, when implementing an SMF+PGW-C, in a 5GS to EPS handover procedure of a UE: receive, from an MME, a message including a first IE containing secondary RAT usage data associated with the UE.

In an embodiment, the message may be a Modify Bearer Request message.

In an embodiment, the first IE may contain a field encoded with content of a Secondary RAT Usage Data Report Transfer IE, and the Secondary RAT Usage Data Report Transfer IE may contain the secondary RAT usage data.

In an embodiment, the first IE may further contain an indication indicating presence of the field.

In an embodiment, the first IE may further contain an EBI associated with a PDU session for the UE.

In an embodiment, the SMF+PGW-C may serve a PDN connection to which the PDU session is mapped.

In an embodiment, the first IE may be of a type Secondary RAT Usage Data Report.

In an embodiment, the first IE may be defined as a container containing a Secondary RAT Usage Data Report Transfer IE, and the Secondary RAT Usage Data Report Transfer IE may contain the secondary RAT usage data.

In an embodiment, the memory 1630 may further contain instructions executable by the processor 1620 whereby the network node 1600 is operative to, when implementing the SMF+PGW-C: transmit the secondary RAT usage data to a management system associated with the 5GS.

Alternatively, the memory 1630 may contain instructions executable by the processor 1620 whereby the network node 1600 is operative to, when implementing an AMF, perform the actions, e.g., of the procedure described earlier in conjunction with FIG. 9. Particularly, the memory 1630 may contain instructions executable by the processor 1620 whereby the network node 1600 is operative to, when implementing an AMF, in an EPS to 5GS handover procedure of a UE: receive, from an MME, a first message including a Secondary RAT Usage Data Report IE containing a secondary RAT usage data associated with the UE; and transmit, to an SMF+PGW-C or to a v-SMF or i-SMF, a second message containing the Secondary RAT Usage Data Report IE.

In an embodiment, the first message may be a Forward Relocation Complete Acknowledge message, and/or the second message may be an Update SmContext Request message.

In an embodiment, the Secondary RAT Usage Data Report IE may be contained in a container in the second message.

Alternatively, the memory 1630 may contain instructions executable by the processor 1620 whereby the network node 1600 is operative to, when implementing an SMF+PGW-C, perform the actions, e.g., of the procedure described earlier in conjunction with FIG. 10. Particularly, the memory 1630 may contain instructions executable by the processor 1620 whereby the network node 1600 is operative to, when implementing an SMF+PGW-C, in an EPS to 5GS handover procedure of a UE: receive, from an AMF or a v-SMF or i-SMF, a message including a Secondary RAT Usage Data Report IE containing a secondary RAT usage data associated with the UE.

In an embodiment, the message received from the AMF may be an Update SmContext Request message, or the message received from the v-SMF or i-SMF may be a Create PDU Session Request message or an Update PDU Session Request message.

In an embodiment, the Secondary RAT Usage Data Report IE may be contained in a container in the message.

In an embodiment, the memory 1630 may further contain instructions executable by the processor 1620 whereby the network node 1600 is operative to, when implementing the SMF+PGW-C: transmit the secondary RAT usage data to a management system associated with the EPS.

Alternatively, the memory 1630 may contain instructions executable by the processor 1620 whereby the network node 1600 is operative to, when implementing a v-SMF or i-SMF, perform the actions, e.g., of the procedure described earlier in conjunction with FIG. 11. Particularly, the memory 1630 may contain instructions executable by the processor 1620 whereby the network node 1600 is operative to, when implementing a v-SMF or i-SMF, in an EPS to 5GS handover procedure of a UE: receive, from an AMF, a first message including a Secondary RAT Usage Data Report IE containing a secondary RAT usage data associated with the UE; and transmit, to an h-SMF or SMF, a second message including the Secondary RAT Usage Data Report IE.

In an embodiment, the first message may be an Update SmContext Request message, and the second message may be a Create PDU Session Request message or an Update PDU Session Request message.

In an embodiment, the Secondary RAT Usage Data Report IE may be contained in a container in the first message and/or the second message.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1620 causes the network node 1600 to perform the actions, e.g., of the procedure described earlier in conjunction with FIG. 6, 7, 8, 9, 10, or 11.

The computer program product may be configured as a computer program code structured in computer program modules. The computer program modules could essentially perform the actions of the flow illustrated in FIG. 6, 7, 8, 9, 10, or 11.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried in a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The present disclosure further provides the following embodiments based on the 3GPP TS 29.274.

7.3.4 Forward Relocation Complete Acknowledge

A Forward Relocation Complete Acknowledge message shall be sent as a response to Forward Relocation Complete Notification.

Table 7.3.4-1 specifies the presence requirements and conditions of the IEs in the message. Possible Cause values are specified in Table 8.4-1.

TABLE 7.3.4-1

Information Elements in a Forward Relocation Complete Acknowledge

| Information elements | P | Condition/Comment | IE Type | Ins. |
|---|---|---|---|---|
| Cause | M | | Cause | 0 |
| Recovery | O | | Recovery | 0 |
| Secondary RAT Usage Data Report | CO | If the PLMN has configured secondary RAT usage reporting, the MME shall include this IE on the S10 interface if it has received Secondary RAT usage data from the eNodeB in an S1-based handover with MME relocation. Several IEs with the same type and instance value may be included, to represent multiple usage data reports. | Secondary RAT Usage Data Report | 0 |
| Secondary RAT Usage Data Report from NG-RAN | CO | This IE shall be included by a source AMF if it has received Secondary RAT Usage Report Data message from the source NG-RAN after sending a Handover Command message. The AMF shall set the EBI field in the Secondary RAT Usage Data Report to any EBI pertaining to the PDU session. Several IEs with the same type and instance value may be included, to represent multiple usage data reports related to different PDU sessions. | Secondary RAT Usage Data Report | 1 |
| Private Extension | O | | Private Extension | VS |

8.132 Secondary RAT Usage Data Report

Secondary RAT Usage Data Report IE is coded as depicted in FIG. 8.*x*-1.

FIG. 8.132-1: Secondary RAT Usage Data Report

| Octets | Bits 8 | 7 | 6 | 5 | 4 | 3 | 2 | 1 |
|---|---|---|---|---|---|---|---|---|
| 1 | Type = 201 (decimal) | | | | | | | |
| 2 to 3 | Length = n | | | | | | | |
| 4 | Spare | | | | Instance | | | |
| 5 | Spare | | | | | SRUDN | IRSGW | IRPGW |
| 6 | Secondary RAT Type | | | | | | | |
| 7 | Spare (all bits set to 0) | | | | EPS Bearer ID (EBI) | | | |
| 8-11 | Start timestamp | | | | | | | |
| 12-15 | End timestamp | | | | | | | |
| 16-23 | Usage Data DL | | | | | | | |
| 24-31 | Usage Data UL | | | | | | | |
| 32-a | Secondary RAT Data Usage Report Transfer | | | | | | | |
| (a + 1) to (n + 4) | These octet(s) is/are present only if explicitly specified | | | | | | | |

The following bits within Octet 5 shall indicate:

Bit 8 to 4—Spare, for future use and set to zero.

Bit 3—SRUDN (Secondary RAT Usage Data Report From NG-RAN): This bit indicates the presence of Secondary RAT Data Usage Report Transfer field. If it is set to "1", the Secondary RAT Data Usage Report Transfer field shall be present, and the IRPGW bit shall be set to "1", octet 6 to 32 shall be set to "0"; otherwise, if it is set to "0", the Secondary RAT Data Usage Report Transfer field shall not be present.

Bit 2—IRSGW (Intended Receiver SGW): This bit defines if the Usage Data Report shall be used by the SGW or not. If set to 1 the SGW shall store it. If set to zero the SGW shall not store it.

Bit 1—IRPGW (Intended Receiver PGW): This bit defines if the Usage Data Report shall be sent to the PGW or not. If set to 1 the SGW shall forward it to PGW and PGW shall store it. If set to zero SGW shall not forward it to PGW.

Octet 6 represents Secondary RAT Type

Secondary RAT Type is coded as depicted in Table 8.132-1.

TABLE 8.132-1

Secondary RAT Type values

| RAT Types | Values (Decimal) |
|---|---|
| NR | 0 |
| Unlicensed Spectrum | 1 |
| <spare> | 2-255 |

The EBI field in octet 7 shall contain the value indicating the EPS Bearer ID. The EBI field shall be encoded as the EBI field in the EPS Bearer ID (EBI) IE type (see clause 8.8). Octets 8 to 11 and 12 to 15 shall be encoded in the same format as the first four octets of the 64-bit timestamp format as defined in clause 6 of IETF RFC 5905 [53]. It indicates the UTC time when the recording of the Secondary RAT Usage Data was started and ended.

NOTE: The encoding is defined as the time in seconds relative to 00:00:00 on 1 Jan. 1900.

Octets 16 to 23 and 24 to 31: The Usage Data UL/DL fields are encoded as octets in binary value. The range of Usage Data UL and Usage Data DL are specified in 3GPP TS 36.413 [10].

Editors Note: The format and range is subject to be aligned with RAN specification. The timestamp and Usage Data UL and DL are received from relevant S1 messages.

The Secondary RAT Data Usage Report Transfer field shall be encoded with the complete NGAP IE Secondary RAT Data Usage Report Transfer as specified in 3GPP TS 38.413 [84].

The present disclosure further provides the following embodiments based on the 3GPP TS 29.502.

5.2.2.3.8.3 EPS to 5GS Handover Execution

The requirements specified in clause 5.2.2.3.4.3 shall apply, with the following modifications.

In step 1 of FIG. 5.2.2.3.4.3-1, the NF Service Consumer, i.e. the target AMF, shall include one or more SecondaryRatUsageDataReportContainer(s) in the SmContextUpdateData for the POST request if it received one or more Secondary RAT Usage Data Report(s) applicable for the PDU session from the source MME.

In step 2 of FIG. 5.2.2.3.4.3-1, for a Home Routed PDU session, the SMF shall complete the execution of the handover by initiating an Update service operation towards the H-SMF in order to switch the PDU session towards the V-UPF (see clause 5.2.2.8.2.3).

5.2.2.8.2.4 EPS to 5GS Handover Execution

The requirements specified in clause 5.2.2.8.2.1 shall apply with the following modifications.

1. Same as step 1 of FIG. 5.2.2.8.2-1, with the following modifications.

The POST request shall contain:

the requestIndication set to PDU_SES_MOB;

the list of EPS Bearer Ids successfully handed over to 5GS;

the hoPreparationIndication IE set to "false", to indicate that there is no handover preparation in progress anymore and that the PGW-C/SMF shall switch the DL user plane of the PDU session;

one or more SecondaryRatUsageDataReportContainer(s) if it received the same in the SmContextUpdateData from the AMF.

2. Same as step 2 of FIG. 5.2.2.8.2-1, with the following modifications.

The H-SMF or SMF shall return a 200 OK response. The H-SMF or SMF shall switch the DL user plane of the PDU session using the N9 tunnel information that has been received in the vcnTunnelInfo or icnTunnelInfo, if the hoPreparationIndication IE was set to "false" in the request.

If the handover preparation failed (e.g. the target 5G-AN failed to establish resources for the PDU session), the requirements specified in clause 5.2.2.8.2.1 shall apply with the following modifications.

1. Same as step 1 of FIG. 5.2.2.8.2-1, with the following modifications.

The POST request shall contain:

the requestIndication set to PDU_SES_MOB;—the cause attribute set to "HO_FAILURE";

an empty list of EPS Bearer Ids;

the hoPreparationIndication IE set to "false", to indicate that there is no handover preparation in progress anymore.

2. Same as step 2 of FIG. 5.2.2.8.2-1, with the following modifications.

The H-SMF or SMF shall return a 200 OK response. The H-SMF or SMF shall release the resources prepared for the handover.

6.1.6.2.4 Type: SmContextUpdateData

TABLE 6.1.6.2.4-1

| Definition of type SmContextUpdateData | | | | | |
|---|---|---|---|---|---|
| Attribute name ... | Data type ... | P ... | Cardinality | Description | Applicability |
| secondaryRatUsageDataReportContainer | array(SecondaryRatUsageDataReportContainer) | C | 1..N | The IE shall be present during an EPS to 5GS handover procedure, if one or more instance of Secondary RAT Usage Data Report IE(s) are present and applicable to the PDU session.<br>When present, it shall contain Base64-encoded characters, encoding the Secondary RAT Usage Data Report in the Forward Relocation Complete Acknowledge message, as specified in FIG. 8.132-1 of 3GPP TS 29.274 [16] (starting from octet 1). | |

6.1.6.2.11 Type: HsmfUpdate Data

TABLE 6.1.6.2.11-1

| Definition of type HsmfUpdateData | | | | | |
|---|---|---|---|---|---|
| Attribute name ... | Data type ... | P ... | Cardinality | Description | Applicability |
| secondaryRatUsageDataReportContainer | array(SecondaryRatUsageDataReportContainer) | C | 1..N | The IE shall be present during an EPS to 5GS handover procedure, if one or more instance of Secondary RAT Usage Data Report IE(s) are present and applicable to the PDU session. | |

TABLE 6.1.6.2.11-1-continued

| Definition of type HsmfUpdateData | | | | | |
|---|---|---|---|---|---|
| Attribute name . . . | Data type . . . | P . . . | Cardinality | Description | Applicability |
| | | | | When present, it shall contain Base64-encoded characters, encoding the Secondary RAT Usage Data Report in the Forward Relocation Complete Acknowledge message, as specified in FIG. 8.132-1 of 3GPP TS 29.274 [16] (starting from octet 1). | |

6.1.6.3.2 Simple data types

The simple data types defined in table 6.1.6.3.2-1 shall be supported.

TABLE 6.1.6.3.2-1

| Simple data types | | |
|---|---|---|
| Type Name . . . | Type Definition . . . | Description . . . |
| SecondaryRatUsageDataReportContainer | string | String with format "byte" as defined in OpenAPI Specification [15], i.e. base64-encoded characters, encoding the Secondary RAT Usage Data Report IE within Forward Relocation Complete Acknowledge specified in Table 7.3.4-1 of 3GPP TS 29.274 [16]. |

A.2 Nsmf_PDUSession API

```
openapi: 3.0.0
info:
  version: '1.2.0-alpha.1'
  title: 'Nsmf_PDUSession'
  description: |
    SMF PDU Session Service.
    © 2021, 3GPP Organizational Partners (ARIB, ATIS, CCSA, ETSI, TSDSI, TTA, TTC).
    All rights reserved.
externalDocs:
  description: 3GPP TS 29.502 V17.0.0; 5G System; Session Management Services; Stage 3
  url: http://www.3gpp.org/ftp/Specs/archive/29_series/29.502/
servers:
  - url: '{apiRoot}/nsmf-pdusession/v1'
    variables:
      apiRoot:
        default: https://example.com
        description: apiRoot as defined in clause 4.4 of 3GPP TS 29.501. The sm-contexts and pdu-sessions resources can be distributed on different processing instances or hosts. Thus the authority and/or deployment-specific string of the apiRoot of the created individual sm context and pdu-session resources' URIs may differ from the authority and/or deployment-specific string of the apiRoot of the sm-contexts and pdu-sessions collections' URIs.
*********skipped for clarity************
    SmContextUpdateData:
      description: Data within Update SM Context Request
      type: object
      properties:
        pei:
          $ref: 'TS29571_CommonData.yaml#/components/schemas/Pei'
        servingNfId:
          $ref: 'TS29571_CommonData.yaml#/components/schemas/NfInstanceId'
        guami:
          $ref: 'TS29571_CommonData.yaml#/components/schemas/Guami'
        servingNetwork:
          $ref: 'TS29571_CommonData.yaml#/components/schemas/PlmnIdNid'
        backupAmfInfo:
          type: array
          items:
            $ref: 'TS29571_CommonData.yaml#/components/schemas/BackupAmfInfo'
          minItems: 1
          nullable: true
```

-continued

```
anType:
  $ref: 'TS29571_CommonData.yaml#/components/schemas/AccessType'
additionalAnType:
  $ref: 'TS29571_CommonData.yaml#/components/schemas/AccessType'
anTypeToReactivate:
  $ref: 'TS29571_CommonData.yaml#/components/schemas/AccessType'
ratType:
  $ref: 'TS29571_CommonData.yaml#/components/schemas/RatType'
presenceInLadn:
  $ref: 'TS29571_CommonData.yaml#/components/schemas/PresenceState'
ueLocation:
  $ref: 'TS29571_CommonData.yaml#/components/schemas/UserLocation'
ueTimeZone:
  $ref: 'TS29571_CommonData.yaml#/components/schemas/TimeZone'
addUeLocation:
  $ref: 'TS29571_CommonData.yaml#/components/schemas/UserLocation'
upCnxState:
  $ref: '#/components/schemas/UpCnxState'
hoState:
  $ref: '#/components/schemas/HoState'
toBeSwitched:
  type: boolean
  default: false
failedToBeSwitched:
  type: boolean
n1SmMsg:
  $ref: 'TS29571_CommonData.yaml#/components/schemas/RefToBinaryData'
n2SmInfo:
  $ref: 'TS29571_CommonData.yaml#/components/schemas/RefToBinaryData'
n2SmInfoType:
  $ref: '#/components/schemas/N2SmInfoType'
targetId:
  $ref: 'TS29518_Namf_Communication.yaml#/components/schemas/NgRanTargetId'
targetServingNfId:
  $ref: 'TS29571_CommonData.yaml#/components/schemas/NfInstanceId'
smContextStatusUri:
  $ref: 'TS29571_CommonData.yaml#/components/schemas/Uri'
dataForwarding:
  type: boolean
  default: false
n9ForwardingTunnel:
  $ref: '#/components/schemas/TunnelInfo'
n9DlForwardingTnlList:
  type: array
  items:
    $ref: '#/components/schemas/IndirectDataForwardingTunnelInfo'
  minItems: 1
n9UlForwardingTnlList:
  type: array
  items:
    $ref: '#/components/schemas/IndirectDataForwardingTunnelInfo'
  minItems: 1
epsBearerSetup:
  type: array
  items:
    $ref: '#/components/schemas/EpsBearerContainer'
  minItems: 0
revokeEbiList:
  type: array
  items:
    $ref: '#/components/schemas/EpsBearerId'
  minItems: 1
release:
  type: boolean
  default: false
cause:
  $ref: '#/components/schemas/Cause'
ngApCause:
  $ref: 'TS29571_CommonData.yaml#/components/schemas/NgApCause'
5gMmCauseValue:
  $ref: 'TS29571_CommonData.yaml#/components/schemas/5GMmCause'
sNssai:
  $ref: 'TS29571_CommonData.yaml#/components/schemas/Snssai'
traceData:
  $ref: 'TS29571_CommonData.yaml#/components/schemas/TraceData'
epsInterworkingInd:
  $ref: '#/components/schemas/EpsInterworkingIndication'
```

```
        anTypeCanBeChanged:
          type: boolean
          default: false
        n2SmInfoExt1:
          $ref: 'TS29571_CommonData.yaml#/components/schemas/RefToBinaryData'
        n2SmInfoTypeExt1:
          $ref: '#/components/schemas/N2SmInfoType'
        maReleaseInd:
          $ref: '#/components/schemas/MaReleaseIndication'
        maNwUpgradeInd:
          type: boolean
          default: false
        maRequestInd:
          type: boolean
          default: false
        exemptionInd:
          $ref: '#/components/schemas/ExemptionInd'
        supportedFeatures:
          $ref: 'TS29571_CommonData.yaml#/components/schemas/SupportedFeatures'
        moExpDataCounter:
          $ref: 'TS29571_CommonData.yaml#/components/schemas/MoExpDataCounter'
        extendedNasSmTimerInd:
          type: boolean
        forwardingFTeid:
          $ref: 'TS29571_CommonData.yaml#/components/schemas/Bytes'
        forwardingBearerContexts:
          type: array
          items:
            $ref: '#/components/schemas/ForwardingBearerContainer'
          minItems: 1
        ddnFailureSubs:
          $ref: '#/components/schemas/DdnFailureSubs'
        secondaryRatUsageDataReportContainer:
          type: array
          items:
            $ref: '#/components/schemas/SecondaryRatUsageDataReportContainer'
          minItems: 1
    SmContextUpdatedData:
      description: Data within Update SM Context Response
      type: object
      properties:
        upCnxState:
          $ref: '#/components/schemas/UpCnxState'
        hoState:
          $ref: '#/components/schemas/HoState'
        releaseEbiList:
          type: array
          items:
            $ref: '#/components/schemas/EpsBearerId'
          minItems: 1
        allocatedEbiList:
          type: array
          items:
            $ref: '#/components/schemas/EbiArpMapping'
          minItems: 1
        modifiedEbiList:
          type: array
          items:
            $ref: '#/components/schemas/EbiArpMapping'
          minItems: 1
        n1SmMsg:
          $ref: 'TS29571_CommonData.yaml#/components/schemas/RefToBinaryData'
        n2SmInfo:
          $ref: 'TS29571_CommonData.yaml#/components/schemas/RefToBinaryData'
        n2SmInfoType:
          $ref: '#/components/schemas/N2SmInfoType'
        epsBearerSetup:
          type: array
          items:
            $ref: '#/components/schemas/EpsBearerContainer'
          minItems: 1
        dataForwarding:
          type: boolean
        n3DlForwardingTnlList:
          type: array
          items:
            $ref: '#/components/schemas/IndirectDataForwardingTunnelInfo'
          minItems: 1
```

-continued

```
        n3UlForwardingTnlList:
          type: array
          items:
            $ref: '#/components/schemas/IndirectDataForwardingTunnelInfo'
          minItems: 1
        cause:
          $ref: '#/components/schemas/Cause'
        maAcceptedInd:
          type: boolean
          default: false
        supportedFeatures:
          $ref: 'TS29571_CommonData.yaml#/components/schemas/SupportedFeatures'
        forwardingFTeid:
          $ref: 'TS29571_CommonData.yaml#/components/schemas/Bytes'
        forwardingBearerContexts:
          type: array
          items:
            $ref: '#/components/schemas/ForwardingBearerContainer'
          minItems: 1
        selectedSmfId:
          $ref: 'TS29571_CommonData.yaml#/components/schemas/NfInstanceId'
        selectedOldSmfId:
          $ref: 'TS29571_CommonData.yaml#/components/schemas/NfInstanceId'
***********skipped for clarity************
    HsmfUpdateData:
      description: Data within Update Request towards H-SMF, or from I-SMF to SMF
      type: object
      properties:
        requestIndication:
          $ref: '#/components/schemas/RequestIndication'
        pei:
          $ref: 'TS29571_CommonData.yaml#/components/schemas/Pei'
        vcnTunnelInfo:
          $ref: '#/components/schemas/TunnelInfo'
        icnTunnelInfo:
          $ref: '#/components/schemas/TunnelInfo'
        additionalCnTunnelInfo:
          $ref: '#/components/schemas/TunnelInfo'
        servingNetwork:
          $ref: 'TS29571_CommonData.yaml#/components/schemas/PlmnIdNid'
        anType:
          $ref: 'TS29571_CommonData.yaml#/components/schemas/AccessType'
        additionalAnType:
          $ref: 'TS29571_CommonData.yaml#/components/schemas/AccessType'
        ratType:
          $ref: 'TS29571_CommonData.yaml#/components/schemas/RatType'
        ueLocation:
          $ref: 'TS29571_CommonData.yaml#/components/schemas/UserLocation'
        ueTimeZone:
          $ref: 'TS29571_CommonData.yaml#/components/schemas/TimeZone'
        addUeLocation:
          $ref: 'TS29571_CommonData.yaml#/components/schemas/UserLocation'
        pauseCharging:
          type: boolean
        pti:
          $ref: '#/components/schemas/ProcedureTransactionId'
        n1SmInfoFromUe:
          $ref: 'TS29571_CommonData.yaml#/components/schemas/RefToBinaryData'
        unknownN1SmInfo:
          $ref: 'TS29571_CommonData.yaml#/components/schemas/RefToBinaryData'
        qosFlowsRelNotifyList:
          type: array
          items:
            $ref: '#/components/schemas/QosFlowItem'
          minItems: 1
        qosFlowsNotifyList:
          type: array
          items:
            $ref: '#/components/schemas/QosFlowNotifyItem'
          minItems: 1
        NotifyList:
          type: array
          items:
            $ref: '#/components/schemas/PduSessionNotifyItem'
          minItems: 1
        epsBearerId:
          type: array
```

```
    items:
      $ref: '#/components/schemas/EpsBearerId'
    minItems: 0
  hoPreparationIndication:
    type: boolean
  revokeEbiList:
    type: array
    items:
      $ref: '#/components/schemas/EpsBearerId'
    minItems: 1
  cause:
    $ref: '#/components/schemas/Cause'
  ngApCause:
    $ref: 'TS29571_CommonData.yaml#/components/schemas/NgApCause'
  5gMmCauseValue:
    $ref: 'TS29571_CommonData.yaml#/components/schemas/5GMmCause'
  alwaysOnRequested:
    type: boolean
    default: false
  epsInterworkingInd:
    $ref: '#/components/schemas/EpsInterworkingIndication'
  secondaryRatUsageReport:
    type: array
    items:
      $ref: 'TS29571_CommonData.yaml#/components/schemas/SecondaryRatUsageReport'
    minItems: 1
  secondaryRatUsageInfo:
    type: array
    items:
      $ref: 'TS29571_CommonData.yaml#/components/schemas/SecondaryRatUsageInfo'
    minItems: 1
  anTypeCanBeChanged:
    type: boolean
    default: false
  maReleaseInd:
    $ref: '#/components/schemas/MaReleaseIndication'
  maNwUpgradeInd:
    type: boolean
    default: false
  maRequestInd:
    type: boolean
    default: false
  unavailableAccessInd:
    $ref: '#/components/schemas/UnavailableAccessIndication'
  psaInfo:
    type: array
    items:
      $ref: '#/components/schemas/PsaInformation'
    minItems: 1
  ulclBpInfo:
    $ref: '#/components/schemas/UlclBpInformation'
  n4Info:
    $ref: '#/components/schemas/N4Information'
  n4InfoExt1:
    $ref: '#/components/schemas/N4Information'
  n4InfoExt2:
    $ref: '#/components/schemas/N4Information'
  presenceInLadn:
    $ref: 'TS29571_CommonData.yaml#/components/schemas/PresenceState'
  vsmfPduSessionUri:
    $ref: 'TS29571_CommonData.yaml#/components/schemas/Uri'
  vsmfId:
    $ref: 'TS29571_CommonData.yaml#/components/schemas/NfInstanceId'
  vSmfServiceInstanceId:
    type: string
  ismfPduSessionUri:
    $ref: 'TS29571_CommonData.yaml#/components/schemas/Uri'
  ismfId:
    $ref: 'TS29571_CommonData.yaml#/components/schemas/NfInstanceId'
  iSmfServiceInstanceId:
    type: string
  dlServingPlmnRateCtl:
    type: integer
    minimum: 10
    nullable: true
  dnaiList:
    type: array
```

-continued

```
        items:
          $ref: 'TS29571_CommonData.yaml#/components/schemas/Dnai'
        minItems: 1
      supportedFeatures:
        $ref: 'TS29571_CommonData.yaml#/components/schemas/SupportedFeatures'
      roamingChargingProfile:
        $ref: 'TS32291_Nchf_ConvergedCharging.yaml#/components/schemas/RoamingChargingProfile'
      moExpDataCounter:
        $ref: 'TS29571_CommonData.yaml#/components/schemas/MoExpDataCounter'
      vplmnQos:
        $ref: '#/components/schemas/VplmnQos'
      securityResult:
        $ref: '#/components/schemas/SecurityResult'
      upSecurityInfo:
        $ref: '#/components/schemas/UpSecurityInfo'
      secondaryRatUsageDataReportContainer:
        type: array
        items:
          $ref: '#/components/schemas/SecondaryRatUsageDataReportContainer'
        minItems: 1
    required:
      - requestIndication
  HsmfUpdatedData:
    description: Data within Update Response from H-SMF, or from SMF to I-SMF
    type: object
    properties:
      n1SmInfoToUe:
        $ref: 'TS29571_CommonData.yaml#/components/schemas/RefToBinaryData'
      n4Info:
        $ref: '#/components/schemas/N4Information'
      n4InfoExt1:
        $ref: '#/components/schemas/N4Information'
      n4InfoExt2:
        $ref: '#/components/schemas/N4Information'
      dnaiList:
        type: array
        items:
          $ref: 'TS29571_CommonData.yaml#/components/schemas/Dnai'
        minItems: 1
      supportedFeatures:
        $ref: 'TS29571_CommonData.yaml#/components/schemas/SupportedFeatures'
      roamingChargingProfile:
        $ref: 'TS32291_Nchf_ConvergedCharging.yaml#/components/schemas/RoamingChargingProfile'
      upSecurity:
        $ref: 'TS29571_CommonData.yaml#/components/schemas/UpSecurity'
      maxIntegrityProtectedDataRateUl:
        $ref: '#/components/schemas/MaxIntegrityProtectedDataRate'
      maxIntegrityProtectedDataRateDl:
        $ref: '#/components/schemas/MaxIntegrityProtectedDataRate'
      ipv6MultiHomingInd:
        type: boolean
        default: false
      qosFlowsSetupList:
        type: array
        items:
          $ref: '#/components/schemas/QosFlowSetupItem'
        minItems: 1
      sessionAmbr:
        $ref: 'TS29571_CommonData.yaml#/components/schemas/Ambr'
      epsPdnCnxInfo:
        $ref: '#/components/schemas/EpsPdnCnxInfo'
      epsBearerInfo:
        type: array
        items:
          $ref: '#/components/schemas/EpsBearerInfo'
        minItems: 1
      pti:
        $ref: '#/components/schemas/ProcedureTransactionId'
**********skipped for clarity*************
#
# SIMPLE DATA TYPES
#
  ProcedureTransactionId:
    description: Procedure Transaction Identifier
    type: integer
    minimum: 0
    maximum: 255
```

-continued

```
  EpsBearerId:
    description: EPS Bearer Identifier
    type: integer
    minimum: 0
    maximum: 15
  EpsPdnCnxContainer:
    description: UE EPS PDN Connection container from SMF to AMF
    type: string
  EpsBearerContainer:
    description: EPS Bearer container from SMF to AMF
    type: string
  Teid:
    type: string
    description: GTP Tunnel Endpoint Identifier
    pattern: '^[A-Fa-f0-9]{8}$'
  EpsBearerContextStatus:
    description: EPS bearer context status
    type: string
    pattern: '^[A-Fa-f0-9]{4}$'
  DrbId:
    description: Data Radio Bearer Identity
    type: integer
    minimum: 1
    maximum: 32
  AdditionalTnlNb:
    description: indicates first, second or third additional indirect data forwarding tunnel
    type: integer
    minimum: 1
    maximum: 3
  ForwardingBearerContainer:
    description: Forwarding Bearer Container
    type: string
  SecondaryRatUsageDataReportContainer:
    description: Secondary Rat Usage Data Report Container
    type: string
**********skipped for clarity*************
```

The invention claimed is:

1. A method in an Access and Mobility Management Function, AMF, comprising, in a 5th Generation System, 5GS, to Evolved Packet System, EPS, handover procedure of a User Equipment, UE:

receiving, from a Next Generation Radio Access Network, NG-RAN, node, a secondary Radio Access Technology, RAT, usage data report message including a Secondary RAT Usage Data Report Transfer Information Element, IE, containing secondary RAT usage data associated with the UE; and transmitting, to a Mobility Management Entity, MME, a message including a first IE containing the secondary RAT usage data, wherein the first IE contains a field encoded with content of the Secondary RAT Usage Data Report Transfer IE, and wherein the first IE further contains an EPS Bearer Identifier, EBI, associated with a Protocol Data Unit, PDU, session for the UE.

2. The method of claim 1, wherein the message is a Forward Relocation Complete Acknowledge message.

3. The method of claim 1, wherein the first IE further contains an indication indicating presence of the field.

4. The method of claim 1, wherein the first IE is of a type Secondary RAT Usage Data Report.

5. The method of claim 1, wherein the first IE is defined as a container containing the Secondary RAT Usage Data Report Transfer IE.

6. The method of claim 1, wherein the secondary RAT usage data report message further contains a handover flag.

7. A method in a Mobility Management Entity, MME, comprising, in a 5th Generation System, 5GS, to Evolved Packet System, EPS, handover procedure of a User Equipment, UE:

receiving, from an Access and Mobility Management Function, AMF, a first message including a first Information Element, IE, containing secondary Radio Access Technology, RAT, usage data associated with the UE; and transmitting, to a Session Management Function and Packet Data Network Gateway-Control, SMF+PGW-C, a second message including the first IE, wherein the first IE contains a field encoded with content of a Secondary RAT Usage Data Report Transfer IE, the Secondary RAT Usage Data Report Transfer IE containing the secondary RAT usage data, and wherein the first IE further contains an EPS Bearer Identifier, EBI, associated with a Protocol Data Unit, PDU, session for the UE.

8. The method of claim 7, wherein the first message is a Forward Relocation Complete Acknowledge message, and/or the second message is a Modify Bearer Request message.

9. The method of claim 7, wherein the first IE further contains an indication indicating presence of the field.

10. The method of claim 7, wherein the SMF+PGW-C serves a Packet Data Network, PDN, connection to which the PDU session is mapped.

11. The method of claim 7, wherein the first IE is of a type Secondary RAT Usage Data Report.

12. The method of claim 7, wherein the first IE is defined as a container containing the Secondary RAT Usage Data Report Transfer IE.

13. A method in a Session Management Function and Packet Data Network Gateway-Control, SMF+PGW-C, comprising, in a 5th Generation System, 5GS, to Evolved Packet System, EPS, handover procedure of a User Equipment, UE:

receiving, from a Mobility Management Entity, MME, a message including a first Information Element, IE, containing secondary Radio Access Technology, RAT, usage data associated with the UE, wherein the first IE contains a field encoded with content of a Secondary RAT Usage Data Report Transfer IE, the Secondary RAT Usage Data Report Transfer IE containing the secondary RAT usage data, and wherein the first IE further contains an EPS Bearer Identifier, EBI, associated with a Protocol Data Unit, PDU, session for the UE.

14. The method of claim 13, wherein the message is a Modify Bearer Request message.

15. The method of claim 13, wherein the first IE further contains an indication indicating presence of the field.

16. The method of claim 13, wherein the SMF+PGW-C serves a Packet Data Network, PDN, connection to which the PDU session is mapped.

17. The method of claim 13, wherein the first IE is of a type Secondary RAT Usage Data Report.

18. The method of claim 13, wherein the first IE is defined as a container containing the Secondary RAT Usage Data Report Transfer IE.

19. The method of claim 13, further comprising:

transmitting the secondary RAT usage data to a management system associated with the 5GS.

20. A network node implementing an Access and Mobility Management Function, AME, comprising:

a communication interface, a processor, and a memory, the memory comprising instructions that when executed by the processor configure the network node, to facilitate a handover procedure of a User Equipment, UE, by:

receiving, from a Next Generation Radio Access Network, NG-RAN, node, a secondary Radio Access Technology, RAT, usage data report message including a Secondary RAT Usage Data Report Transfer Information Element, IE, containing secondary RAT usage data associated with the UE; and transmitting, to a Mobility Management Entity, MME, a message including a first IE containing the secondary RAT usage data, wherein the first IE contains a field encoded with content of the Secondary RAT Usage Data Report Transfer IE, and wherein the first IE further contains an EPS Bearer Identifier, EBI, associated with a Protocol Data Unit, PDU, session for the UE.

21. The network node of claim 20, wherein the message is a Forward Relocation Complete Acknowledge message.

22. The network node of claim 20, wherein the secondary RAT usage data report message further contains a handover flag.

* * * * *